(12) United States Patent
Zhang et al.

(10) Patent No.: US 10,386,609 B2
(45) Date of Patent: Aug. 20, 2019

(54) OPTICAL IMAGING LENS

(71) Applicant: Genius Electronic Optical Co., Ltd., Taichung (TW)

(72) Inventors: Jiayuan Zhang, Fujian (CN); Fensha Cai, Fujian (CN); Jing Ning, Fujian (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 90 days.

(21) Appl. No.: 15/725,296

(22) Filed: Oct. 5, 2017

(65) Prior Publication Data

US 2019/0064481 A1 Feb. 28, 2019

(30) Foreign Application Priority Data

Aug. 22, 2017 (CN) .......................... 2017 1 0725663

(51) Int. Cl.
*G02B 13/00* (2006.01)
*G02B 9/60* (2006.01)
*G02B 7/02* (2006.01)

(52) U.S. Cl.
CPC ......... *G02B 13/0045* (2013.01); *G02B 7/028* (2013.01); *G02B 9/60* (2013.01)

(58) Field of Classification Search
CPC ....... G02B 13/0045; G02B 9/60; G02B 7/028
USPC ......................................... 359/714
See application file for complete search history.

(56) References Cited

FOREIGN PATENT DOCUMENTS

CN 104166220 A * 11/2014

* cited by examiner

*Primary Examiner* — Evan P Dzierzynski
*Assistant Examiner* — Mitchell T Oestreich
(74) *Attorney, Agent, or Firm* — JCIPRNET

(57) ABSTRACT

The invention provides an optical imaging lens including a first lens element, a second lens element, a third lens element, a fourth lens element, and a fifth lens element from an object side to an image side. The optical imaging lens has a shorter lens length, an enlarged field of view angle, and good thermal stability performance in a good optical performance condition via controlling arrangement of concave and convex curvatures of object-side surfaces or image-side surfaces of the lens elements and controlling relevant parameters via at least one condition expression.

18 Claims, 36 Drawing Sheets

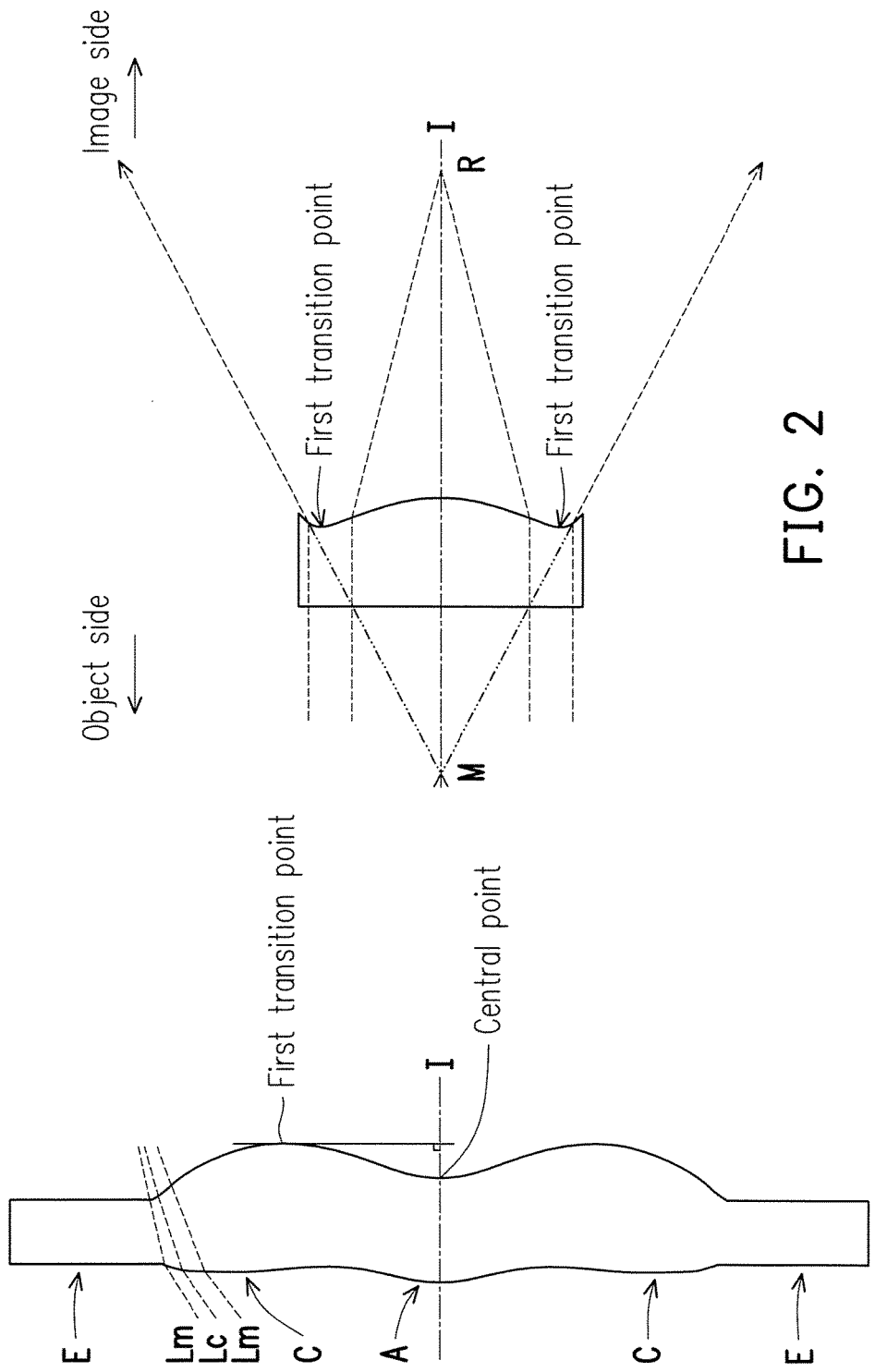

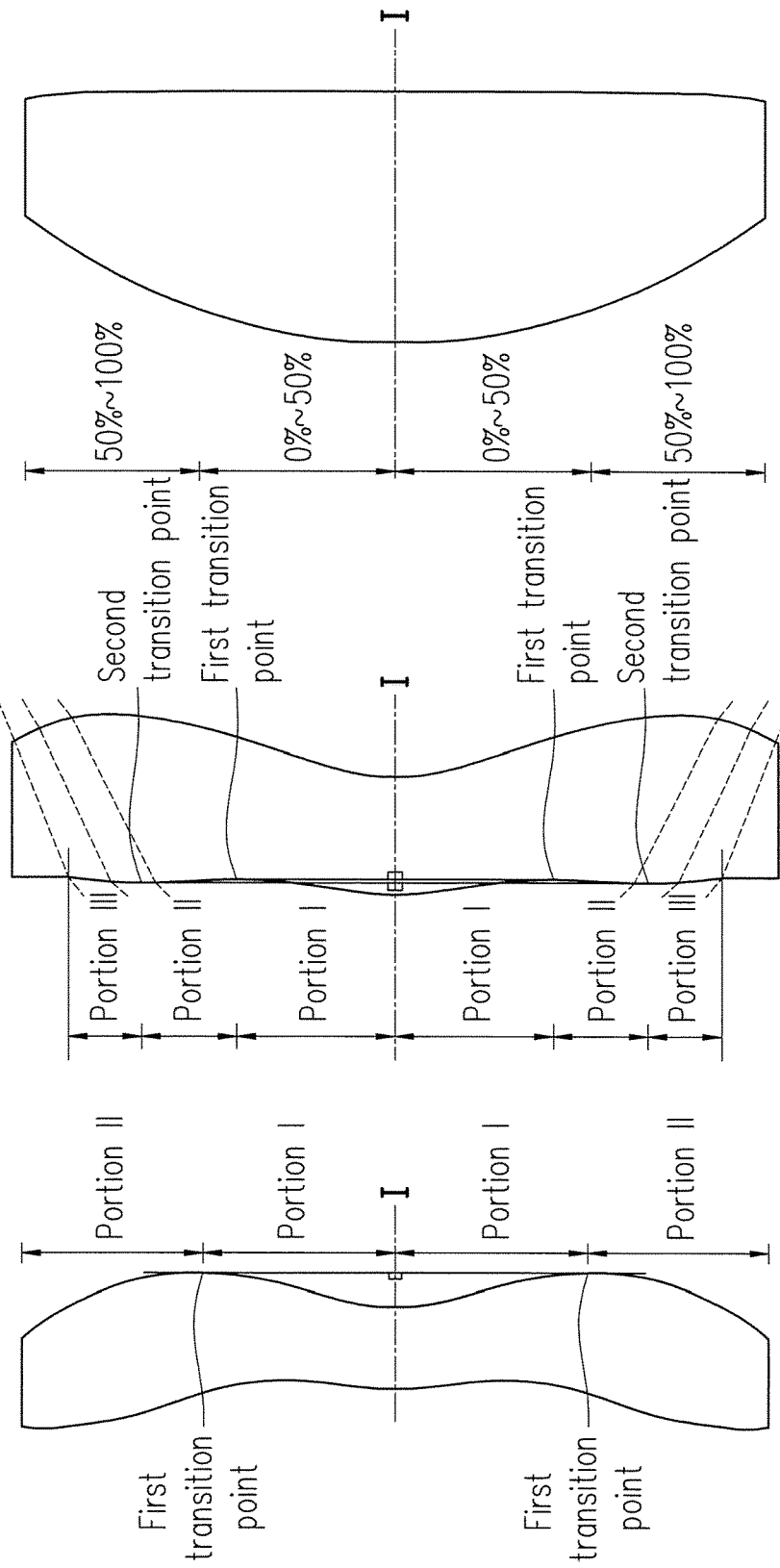

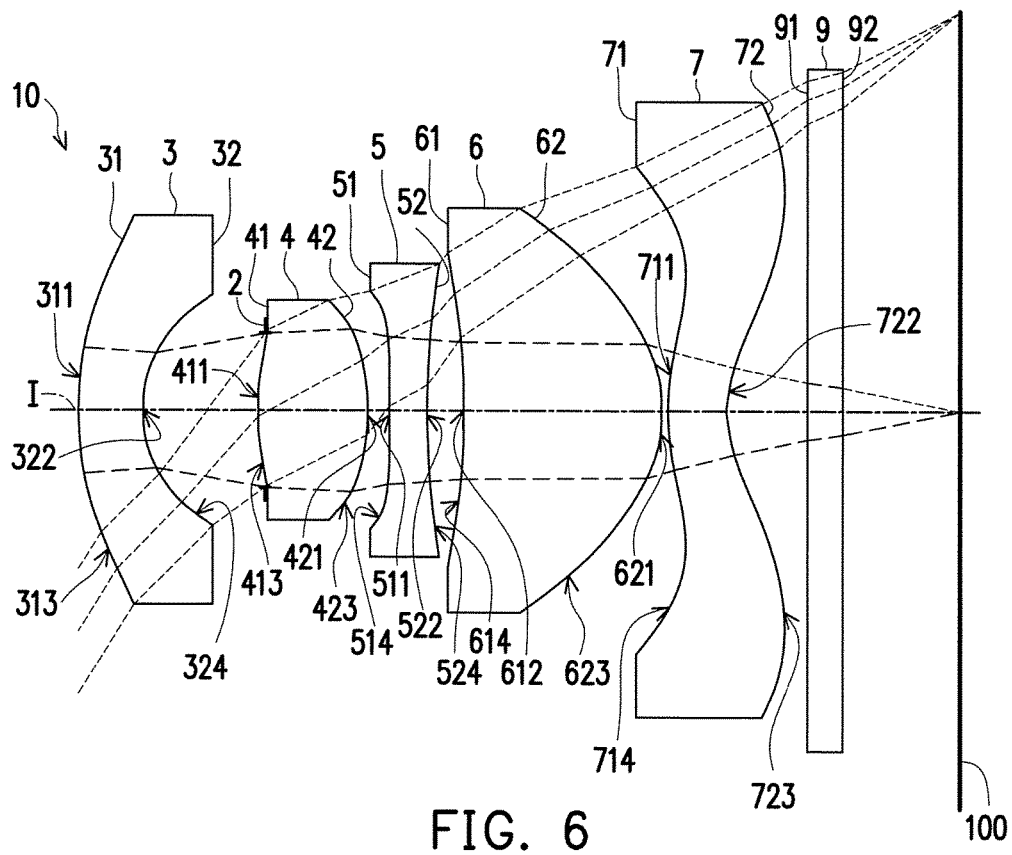
FIG. 6
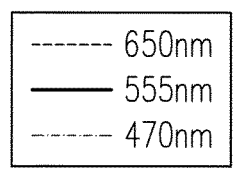
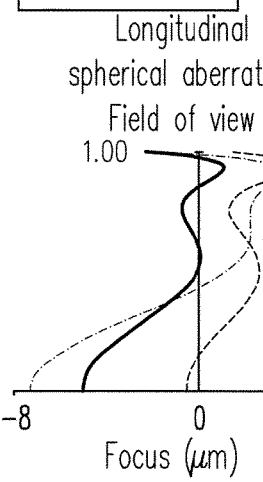
FIG. 7A
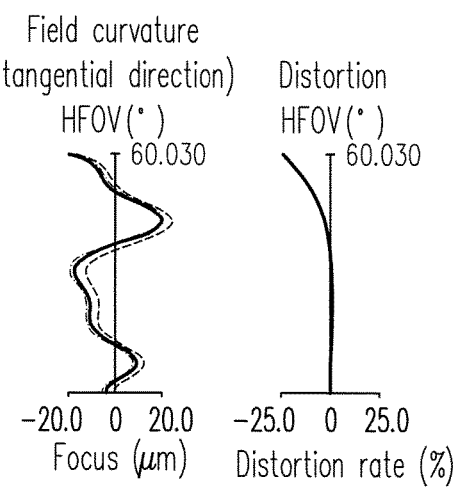
FIG. 7B    FIG. 7C    FIG. 7D

| First Embodiment | | | | | | | |
|---|---|---|---|---|---|---|---|
| System Focal Length = 1.924 mm , Half Field of View =60.03°, F-Number =2.4, System Length= 5.501mm, Image Height =2.525 mm | | | | | | | |
| Lens Element | Surface | Surface Type | Radius of Curvature(mm) | Thickness (mm) | Material | Refractive Index (Nd) | Dispersion Coefficient (Vd) | Focal Length (mm) |
| Object | | Spheric Surface | Infinity | Infinity | | | | |
| First Lens Element 3 | Object-side surface31 | Aspheric Surface | 2.284 | 0.397 | Plastic | 1.535 | 55.712 | -2.730 |
| | Image-side surface32 | Aspheric Surface | 0.839 | 0.763 | | | | |
| Aperture stop 2 | | Spheric Surface | Infinity | -0.040 | | | | |
| Second Lens Element 4 | Object-side surface41 | Aspheric Surface | 2.047 | 0.682 | Plastic | 1.535 | 55.780 | 1.835 |
| | Image-side surface42 | Aspheric Surface | -1.678 | 0.137 | | | | |
| Third Lens Element 5 | Object-side surface51 | Aspheric Surface | 5.851 | 0.232 | Plastic | 1.642 | 22.409 | -6.844 |
| | Image-side surface52 | Aspheric Surface | 2.482 | 0.232 | | | | |
| Fourth Lens Element 6 | Object-side surface61 | Aspheric Surface | -5.668 | 1.240 | Glass | 1.553 | 71.685 | 1.657 |
| | Image-side surface62 | Aspheric Surface | -0.853 | 0.037 | | | | |
| Fifth Lens Element 7 | Object-side surface71 | Aspheric Surface | 1.385 | 0.367 | Plastic | 1.642 | 22.409 | -2.672 |
| | Image-side surface72 | Aspheric Surface | 0.689 | 0.514 | | | | |
| Filter 9 | Object-side surface91 | Spheric Surface | Infinity | 0.210 | | | | |
| | Image-side surface92 | Spheric Surface | Infinity | 0.731 | | | | |
| Image Plane 100 | | | Infinity | | | | | |

FIG. 8

| Surface | K | $a_2$ | $a_4$ | $a_6$ | $a_8$ |
|---|---|---|---|---|---|
| 31 | 1.283830E+00 | 0.000000E+00 | 3.816472E-02 | -4.017317E-02 | -5.498001E-03 |
| 32 | -9.109705E-01 | 0.000000E+00 | 2.991908E-01 | 1.707322E-01 | 0.000000E+00 |
| 41 | -1.260135E+00 | 0.000000E+00 | -2.166294E-02 | 6.966277E-02 | -9.061555E-01 |
| 42 | 1.044176E+00 | 0.000000E+00 | -4.102844E-01 | 9.635318E-01 | -2.919323E+00 |
| 51 | 0.000000E+00 | 0.000000E+00 | -7.748201E-01 | 1.062599E+00 | -1.075937E+00 |
| 52 | 4.044626E+00 | 0.000000E+00 | -5.110370E-01 | 6.895117E-01 | -5.360999E-01 |
| 61 | 2.482565E+01 | 0.000000E+00 | 3.652515E-02 | -2.743310E-01 | 4.662961E-01 |
| 62 | -4.658302E+00 | 0.000000E+00 | -3.868307E-01 | 5.959886E-01 | -9.123231E-01 |
| 71 | -2.464857E+00 | 0.000000E+00 | -3.111647E-01 | 1.585063E-01 | -1.325729E-01 |
| 72 | -3.505911E+00 | 0.000000E+00 | -1.532556E-01 | 5.635618E-02 | -7.322274E-03 |
| Surface | $a_{10}$ | $a_{12}$ | $a_{14}$ | $a_{16}$ | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 4.636986E+00 | -4.308654E+00 | 0.000000E+00 | 0.000000E+00 | |
| 51 | 0.000000E+00 | 0.000000E+00 | 0.000000E+00 | 0.000000E+00 | |
| 52 | 2.896398E-01 | -1.299660E-01 | 0.000000E+00 | 0.000000E+00 | |
| 61 | -3.325031E-01 | 2.272390E-01 | -9.866782E-02 | 0.000000E+00 | |
| 62 | 9.309680E-01 | -5.801021E-01 | 1.952739E-01 | -2.658872E-02 | |
| 71 | 1.137822E-01 | -5.877456E-02 | 1.537202E-02 | -1.566175E-03 | |
| 72 | -2.492450E-03 | 1.142067E-03 | -1.797334E-04 | 1.082419E-05 | |

FIG. 9

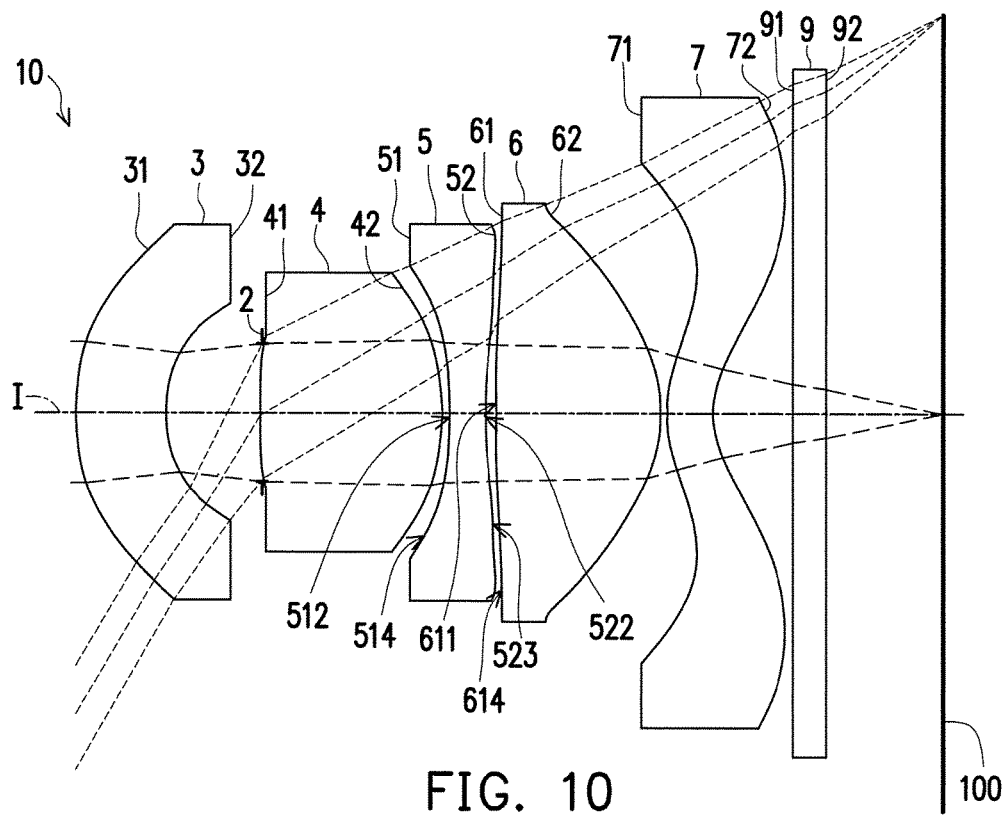
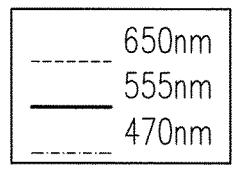
FIG. 10
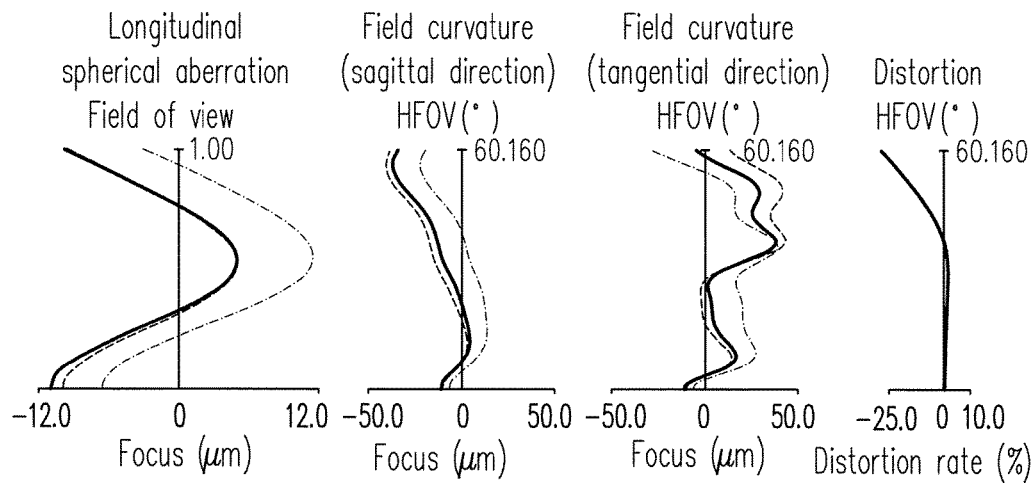
FIG. 11A  FIG. 11B  FIG. 11C  FIG. 11D

| Second Embodiment | | | | | | | | |
|---|---|---|---|---|---|---|---|---|
| System Focal Length = 2.132 mm , Half Field of View =60.16°, F-Number =2.4, System Length= 5.498mm, Image Height =2.525 mm | | | | | | | | |
| Lens Element | Surface | Surface Type | Radius of Curvature(mm) | Thickness (mm) | Material | Refractive Index (Nd) | Dispersion Coefficient (Vd) | Focal Length (mm) |
| Object | | Spheric Surface | Infinity | Infinity | | | | |
| First Lens Element 3 | Object-side surface31 | Aspheric Surface | 1.452 | 0.570 | Plastic | 1.545 | 55.987 | -5.042 |
| | Image-side surface32 | Aspheric Surface | 0.819 | 0.609 | | | | |
| Aperture stop 2 | | Spheric Surface | Infinity | -0.010 | | | | |
| Second Lens Element 4 | Object-side surface41 | Spheric Surface | 3.933 | 1.154 | Glass | 1.678 | 55.560 | 1.649 |
| | Image-side surface42 | Spheric Surface | -1.382 | 0.045 | | | | |
| Third Lens Element 5 | Object-side surface51 | Aspheric Surface | -4.558 | 0.228 | Plastic | 1.642 | 22.409 | -2.350 |
| | Image-side surface52 | Aspheric Surface | 2.328 | 0.068 | | | | |
| Fourth Lens Element 6 | Object-side surface61 | Aspheric Surface | 968.988 | 1.044 | Plastic | 1.545 | 55.987 | 1.523 |
| | Image-side surface62 | Aspheric Surface | -0.832 | 0.040 | | | | |
| Fifth Lens Element 7 | Object-side surface71 | Aspheric Surface | 0.934 | 0.286 | Plastic | 1.535 | 55.712 | -2.844 |
| | Image-side surface72 | Aspheric Surface | 0.517 | 0.514 | | | | |
| Filter 9 | Object-side surface91 | Spheric Surface | Infinity | 0.210 | | | | |
| | Image-side surface92 | Spheric Surface | Infinity | 0.739 | | | | |
| | Image Plane 100 | | Infinity | | | | | |

FIG. 12

| Sur-face | K | $a_2$ | $a_4$ | $a_6$ | $a_8$ |
|---|---|---|---|---|---|
| 31 | 1.798159E-01 | 0.000000E+00 | 2.399159E-02 | 5.068988E-03 | 8.582003E-04 |
| 32 | -2.226213E+00 | 0.000000E+00 | 6.076875E-01 | -7.529210E-02 | 1.394795E+00 |
| 51 | 0.000000E+00 | 0.000000E+00 | -5.847994E-01 | 1.219706E+00 | -2.245699E+00 |
| 52 | -2.431024E+01 | 0.000000E+00 | -2.807647E-01 | 6.453775E-01 | -1.032154E+00 |
| 61 | 0.000000E+00 | 0.000000E+00 | 1.893176E-01 | -4.053806E-01 | 5.906000E-01 |
| 62 | -3.209888E+00 | 0.000000E+00 | -4.912828E-02 | -9.420899E-02 | 1.802020E-01 |
| 71 | -6.588245E+00 | 0.000000E+00 | 3.277792E-02 | -3.757257E-01 | 4.655508E-01 |
| 72 | -3.134278E+00 | 0.000000E+00 | -8.871873E-02 | -1.486365E-02 | 3.185987E-02 |
| Sur-face | $a_{10}$ | $a_{12}$ | $a_{14}$ | $a_{16}$ | |
| 31 | -9.625690E-03 | 1.718380E-03 | -6.059316E-03 | 1.753267E-04 | |
| 32 | -2.806392E+00 | 2.642220E+00 | -1.096305E+00 | -1.521314E-01 | |
| 51 | 3.363585E+00 | -3.410199E+00 | 1.965598E+00 | -5.282308E-01 | |
| 52 | 1.020366E+00 | -5.787183E-01 | 1.874641E-01 | -3.278435E-02 | |
| 61 | -7.278069E-01 | 5.781618E-01 | -2.283620E-01 | 3.223284E-02 | |
| 62 | -1.830369E-01 | 1.191737E-01 | -5.104097E-02 | 1.101226E-02 | |
| 71 | -3.665776E-01 | 1.726803E-01 | -4.257434E-02 | 4.215745E-03 | |
| 72 | -1.827653E-02 | 5.499078E-03 | -8.448198E-04 | 5.166533E-05 | |

FIG. 13

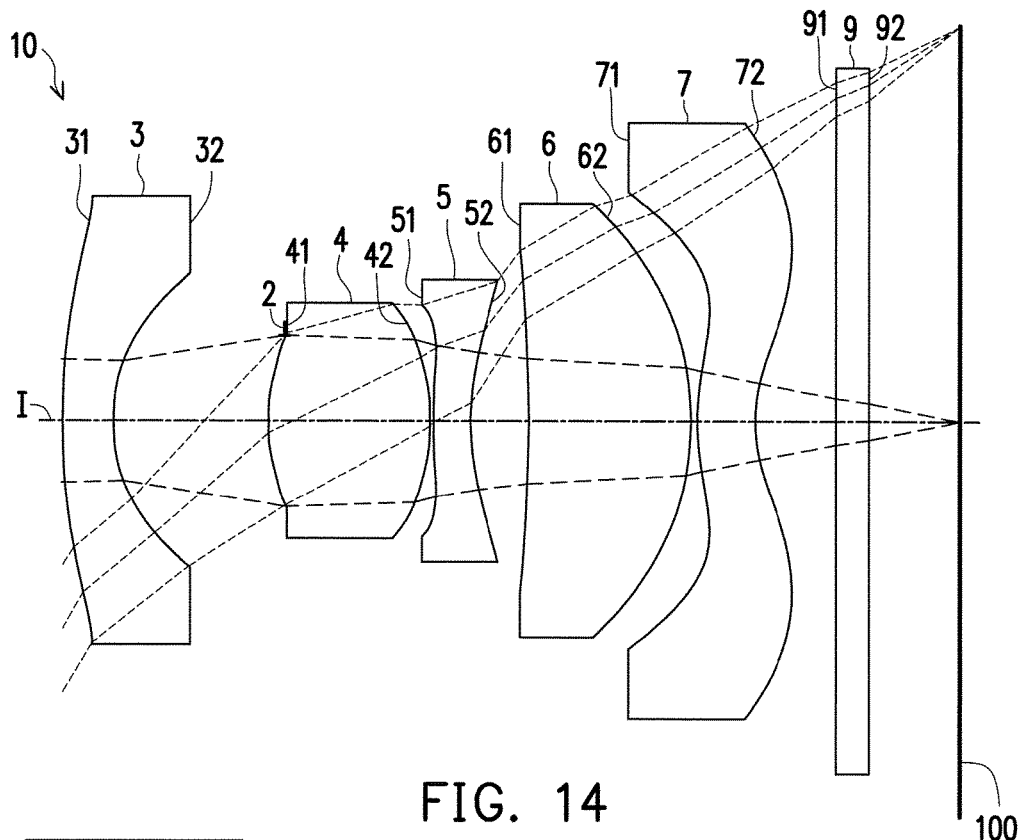
FIG. 14
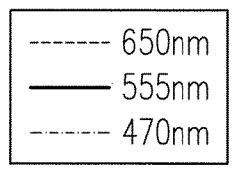
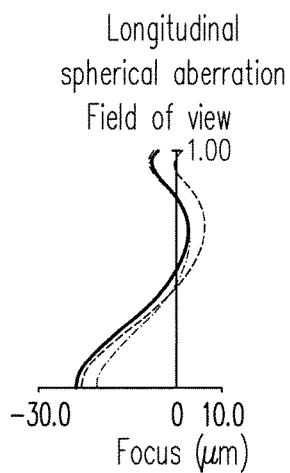
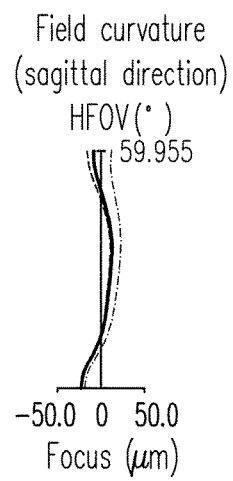
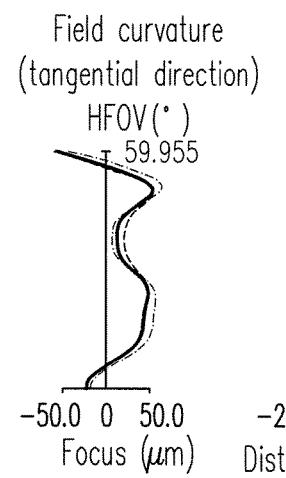
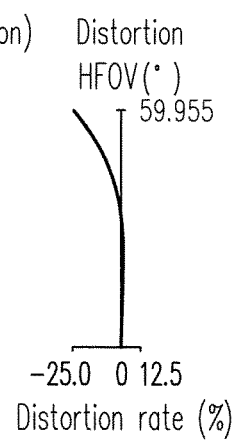
FIG. 15A  FIG. 15B  FIG. 15C  FIG. 15D

| Third Embodiment | | | | | | | | |
|---|---|---|---|---|---|---|---|---|
| System Focal Length = 1.934 mm, Half Field of View =59.955°, F-Number =2.4, System Length= 5.704 mm, Image Height =2.525 mm | | | | | | | | |
| Lens Element | Surface | Surface Type | Radius of Curvature(mm) | Thickness (mm) | Material | Refractive Index (Nd) | Dispersion Coefficient (Vd) | Focal Length (mm) |
| Object | | Spheric Surface | Infinity | Infinity | | | | |
| First Lens Element 3 | Object-side surface31 | Aspheric Surface | 6.094 | 0.320 | Plastic | 1.536 | 55.794 | -2.669 |
| | Image-side surface32 | Aspheric Surface | 1.139 | 1.091 | | | | |
| Aperture stop 2 | | Spheric Surface | Infinity | -0.101 | | | | |
| Second Lens Element 4 | Object-side surface41 | Aspheric Surface | 1.368 | 1.025 | Plastic | 1.535 | 55.780 | 1.398 |
| | Image-side surface42 | Aspheric Surface | -1.227 | 0.025 | | | | |
| Third Lens Element 5 | Object-side surface51 | Aspheric Surface | 5.635 | 0.230 | Plastic | 1.642 | 22.409 | -2.780 |
| | Image-side surface52 | Aspheric Surface | 1.342 | 0.374 | | | | |
| Fourth Lens Element 6 | Object-side surface61 | Spheric Surface | -10.977 | 1.033 | Glass | 1.729 | 54.680 | 2.869 |
| | Image-side surface62 | Spheric Surface | -1.832 | 0.040 | | | | |
| Fifth Lens Element 7 | Object-side surface71 | Aspheric Surface | 1.540 | 0.370 | Plastic | 1.642 | 22.409 | -5.482 |
| | Image-side surface72 | Aspheric Surface | 0.972 | 0.512 | | | | |
| Filter 9 | Object-side surface91 | Spheric Surface | Infinity | 0.210 | | | | |
| | Image-side surface92 | Spheric Surface | Infinity | 0.575 | | | | |
| | Image Plane 100 | | Infinity | | | | | |

FIG. 16

| Surface | K | $a_2$ | $a_4$ | $a_6$ | $a_8$ |
|---|---|---|---|---|---|
| 31 | 1.118706E+01 | 0.000000E+00 | 5.713919E-02 | -5.228071E-02 | 1.433633E-02 |
| 32 | -4.233390E+00 | 0.000000E+00 | 4.089522E-01 | -1.545776E-01 | 0.000000E+00 |
| 41 | 1.034416E+00 | 0.000000E+00 | -2.908760E-02 | -3.904890E-01 | 9.732690E-01 |
| 42 | -1.414008E+01 | 0.000000E+00 | -3.249586E-01 | 3.846319E-01 | -1.055283E+00 |
| 51 | 0.000000E+00 | 6.648692E-09 | -7.608024E-02 | -1.381033E-01 | 3.361786E-01 |
| 52 | -3.679952E+00 | -2.396555E-08 | -7.347528E-01 | 3.117148E+00 | -8.866610E+00 |
| 71 | -4.115794E-01 | -6.169138E-03 | -1.749323E+00 | -5.854469E-02 | -3.252221E-01 |
| 72 | -3.014975E+00 | 5.450344E-02 | -4.910683E+00 | 9.000536E+00 | -1.486292E+01 |
| Surface | $a_{10}$ | $a_{12}$ | $a_{14}$ | $a_{16}$ | $a_{18}$ |
| 31 | -1.938529E-03 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | -1.563048E+00 | 0.000000E+00 | 0.000000E+00 | 0.000000E+00 | 0.000000E+00 |
| 42 | 9.272947E-01 | -5.410479E-01 | 0.000000E+00 | 0.000000E+00 | 0.000000E+00 |
| 51 | -9.494244E-01 | 1.090114E+00 | -5.611689E-01 | 0.000000E+00 | 0.000000E+00 |
| 52 | 1.457450E+01 | -1.255979E+01 | 4.537727E+00 | 0.000000E+00 | 0.000000E+00 |
| 71 | 6.146291E+00 | -1.341404E+01 | 1.046297E+01 | 1.253337E+00 | -5.815542E+00 |
| 72 | 2.962748E+01 | -4.713261E+01 | 2.690923E+01 | 3.210503E+01 | -5.262308E+01 |
| Surface | $a_{20}$ | $R_N$ | | | |
| 31 | 0.000000E+00 | 1.000000E+00 | | | |
| 32 | 0.000000E+00 | 1.000000E+00 | | | |
| 41 | 0.000000E+00 | 1.000000E+00 | | | |
| 42 | 0.000000E+00 | 1.000000E+00 | | | |
| 51 | 0.000000E+00 | 8.287066E-01 | | | |
| 52 | 0.000000E+00 | 1.149368E+00 | | | |
| 71 | 2.188028E+00 | 1.481074E+00 | | | |
| 72 | 2.034113E+01 | 2.174726E+00 | | | |

FIG. 17

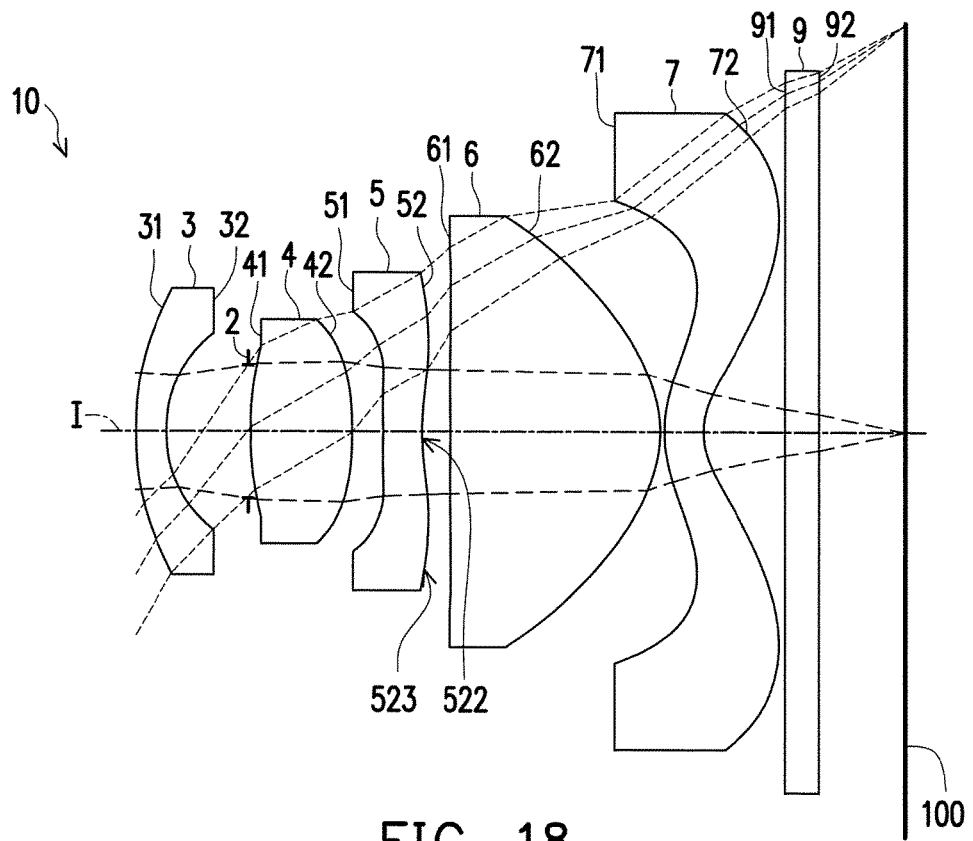
FIG. 18
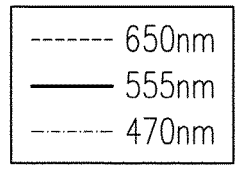
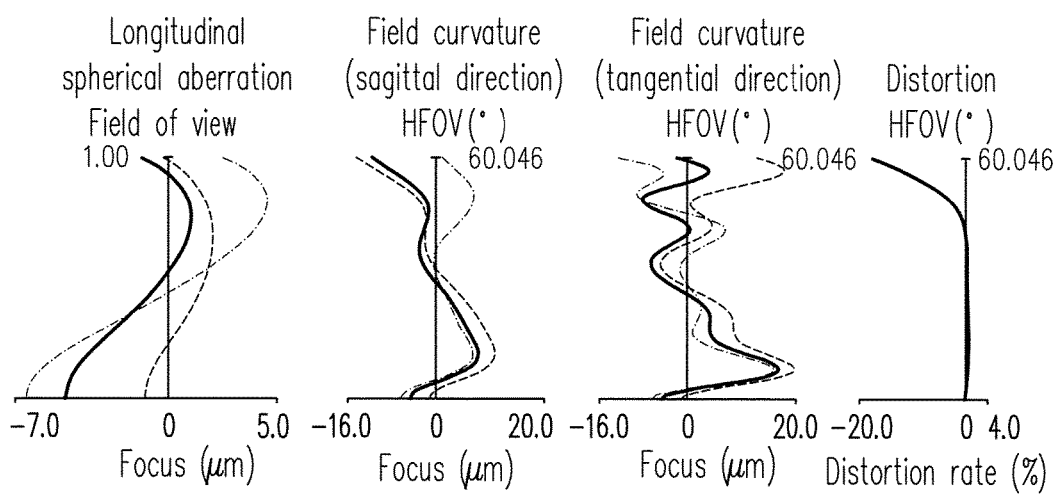
FIG. 19A  FIG. 19B  FIG. 19C  FIG. 19D

| Fourth Embodiment |||||||||
|---|---|---|---|---|---|---|---|---|
| System Focal Length = 1.758 mm, Half Field of View =60.05°, F-Number =2.42, System Length= 4.814 mm, Image Height =2.525 mm |||||||||
| Lens Element | Surface | Surface Type | Radius of Curvature(mm) | Thickness (mm) | Material | Refractive Index (Nd) | Dispersion Coefficient (Vd) | Focal Length (mm) |
| Object | | Spheric Surface | Infinity | Infinity | | | | |
| First Lens Element 3 | Object-side surface31 | Aspheric Surface | 1.942 | 0.199 | Plastic | 1.535 | 55.712 | -3.093 |
| | Image-side surface32 | Aspheric Surface | 0.863 | 0.505 | | | | |
| Aperture stop 2 | | Spheric Surface | Infinity | 0.019 | | | | |
| Second Lens Element 4 | Object-side surface41 | Aspheric Surface | 2.260 | 0.631 | Plastic | 1.535 | 55.780 | 2.107 |
| | Image-side surface42 | Aspheric Surface | -2.043 | 0.190 | | | | |
| Third Lens Element 5 | Object-side surface51 | Aspheric Surface | 3.722 | 0.249 | Plastic | 1.642 | 22.409 | -6.949 |
| | Image-side surface52 | Aspheric Surface | 1.983 | 0.180 | | | | |
| Fourth Lens Element 6 | Object-side surface61 | Aspheric Surface | -120.482 | 1.308 | Glass | 1.553 | 71.685 | 1.231 |
| | Image-side surface62 | Aspheric Surface | -0.682 | 0.026 | | | | |
| Fifth Lens Element 7 | Object-side surface71 | Aspheric Surface | 0.766 | 0.245 | Plastic | 1.642 | 22.409 | -1.845 |
| | Image-side surface72 | Aspheric Surface | 0.408 | 0.514 | | | | |
| Filter 9 | Object-side surface91 | Spheric Surface | Infinity | 0.210 | | | | |
| | Image-side surface92 | Spheric Surface | Infinity | 0.539 | | | | |
| | Image Plane 100 | | Infinity | | | | | |

FIG. 20

| Surface | K | $a_2$ | $a_4$ | $a_6$ | $a_8$ |
|---|---|---|---|---|---|
| 31 | 2.155034E+00 | 0.000000E+00 | 5.557836E-02 | -4.988555E-02 | -1.018532E-01 |
| 32 | -7.318110E-01 | 0.000000E+00 | 3.236311E-01 | 4.307554E-01 | -9.608379E-02 |
| 41 | 1.203450E+00 | 0.000000E+00 | 1.789866E-02 | -2.992019E-02 | -3.468960E-01 |
| 42 | 2.413263E+00 | 0.000000E+00 | -4.480476E-01 | 8.065726E-01 | -2.799570E+00 |
| 51 | 0.000000E+00 | 0.000000E+00 | -9.456615E-01 | 6.962346E-01 | -9.534400E-01 |
| 52 | 2.291974E-01 | 0.000000E+00 | -6.351622E-01 | 6.476480E-01 | -5.207881E-01 |
| 61 | 6.982959E+03 | 0.000000E+00 | 5.301807E-02 | -2.192085E-01 | 4.096965E-01 |
| 62 | -4.365594E+00 | 0.000000E+00 | -3.836046E-01 | 6.279446E-01 | -9.354850E-01 |
| 71 | -4.129734E+00 | 0.000000E+00 | -1.999206E-01 | 7.367199E-02 | -1.273278E-01 |
| 72 | -2.781439E+00 | 0.000000E+00 | -1.747872E-01 | 5.747816E-02 | -7.372148E-03 |
| Surface | $a_{10}$ | $a_{12}$ | $a_{14}$ | $a_{16}$ | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 5.018382E+00 | -4.342331E+00 | 0.000000E+00 | 0.000000E+00 | |
| 51 | 0.000000E+00 | 0.000000E+00 | 0.000000E+00 | 0.000000E+00 | |
| 52 | 2.956281E-01 | -8.230831E-02 | 0.000000E+00 | 0.000000E+00 | |
| 61 | -4.043800E-01 | 2.124381E-01 | -4.837626E-02 | 0.000000E+00 | |
| 62 | 9.279781E-01 | -5.725413E-01 | 1.984044E-01 | -2.928461E-02 | |
| 71 | 1.167197E-01 | -6.002200E-02 | 1.485633E-02 | -1.524020E-03 | |
| 72 | -2.545759E-03 | 1.140314E-03 | -1.774985E-04 | 1.018219E-05 | |

FIG. 21

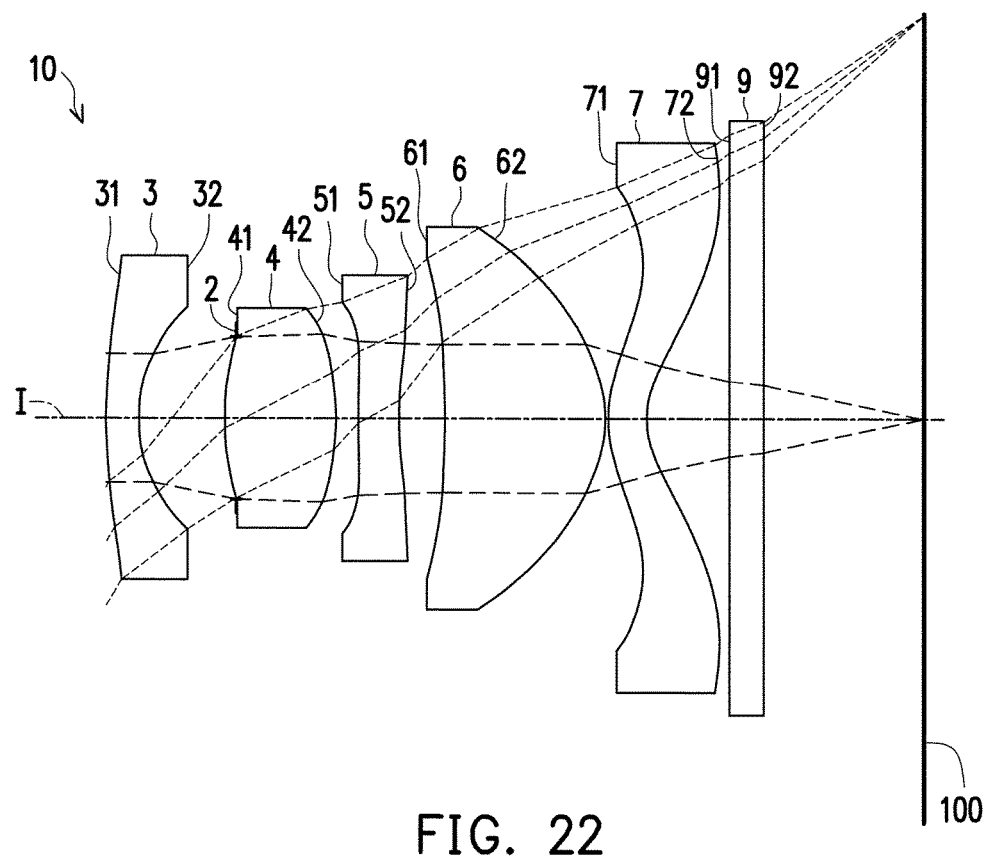
FIG. 22
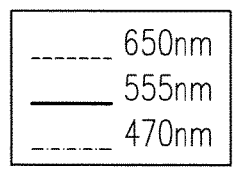
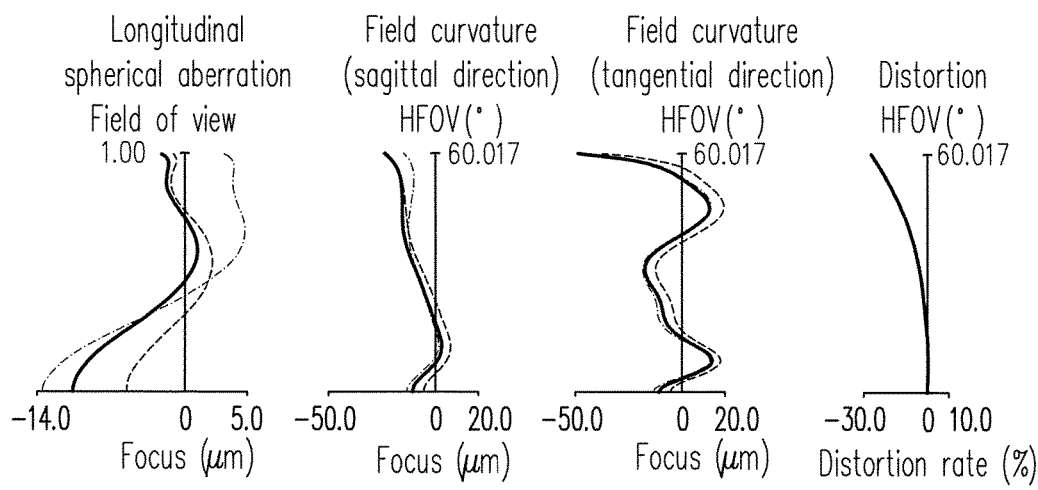
FIG. 23A  FIG. 23B  FIG. 23C  FIG. 23D

| Fifth Embodiment ||||||||
|---|---|---|---|---|---|---|---|
| System Focal Length = 1.980 mm, Half Field of View =60.02°, F-Number =2.44, System Length= 5.090 mm, Image Height =2.525 mm ||||||||
| Lens Element | Surface | Surface Type | Radius of Curvature(mm) | Thickness (mm) | Material | Refractive Index (Nd) | Dispersion Coefficient (Vd) | Focal Length (mm) |
| Object | | Spheric Surface | Infinity | Infinity | | | | |
| First Lens Element 3 | Object-side surface31 | Aspheric Surface | 3.586 | 0.205 | Plastic | 1.535 | 55.712 | -2.447 |
| | Image-side surface32 | Aspheric Surface | 0.943 | 0.604 | | | | |
| Aperture stop 2 | | Spheric Surface | Infinity | -0.067 | | | | |
| Second Lens Element 4 | Object-side surface41 | Aspheric Surface | 1.760 | 0.688 | Plastic | 1.535 | 55.780 | 1.913 |
| | Image-side surface42 | Aspheric Surface | -2.129 | 0.141 | | | | |
| Third Lens Element 5 | Object-side surface51 | Aspheric Surface | 4.076 | 0.250 | Plastic | 1.642 | 22.409 | -7.245 |
| | Image-side surface52 | Aspheric Surface | 2.128 | 0.285 | | | | |
| Fourth Lens Element 6 | Object-side surface61 | Aspheric Surface | -5.559 | 0.999 | Glass | 1.553 | 71.685 | 1.535 |
| | Image-side surface62 | Aspheric Surface | -0.786 | 0.021 | | | | |
| Fifth Lens Element 7 | Object-side surface71 | Aspheric Surface | 0.828 | 0.239 | Plastic | 1.642 | 22.409 | -2.608 |
| | Image-side surface72 | Aspheric Surface | 0.492 | 0.514 | | | | |
| Filter 9 | Object-side surface91 | Spheric Surface | Infinity | 0.210 | | | | |
| | Image-side surface92 | Spheric Surface | Infinity | 1.000 | | | | |
| | Image Plane 100 | | Infinity | | | | | |

FIG. 24

| Surface | K | $a_2$ | $a_4$ | $a_6$ | $a_8$ |
|---|---|---|---|---|---|
| 31 | -1.608968E+00 | 0.000000E+00 | -4.126001E-02 | 1.065515E-03 | -2.870378E-03 |
| 32 | -1.812381E+00 | 0.000000E+00 | 2.443532E-01 | 4.749384E-02 | 4.272392E-02 |
| 41 | -3.668414E-01 | 0.000000E+00 | -1.852667E-03 | 7.456467E-02 | -5.268260E-01 |
| 42 | 1.120786E+00 | 0.000000E+00 | -4.266958E-01 | 1.059364E+00 | -3.017143E+00 |
| 51 | 0.000000E+00 | 0.000000E+00 | -8.252044E-01 | 9.667499E-01 | -1.006337E+00 |
| 52 | 1.846945E+00 | 0.000000E+00 | -5.565186E-01 | 6.616164E-01 | -5.638613E-01 |
| 61 | 1.357183E+01 | 0.000000E+00 | 6.788666E-02 | -3.000837E-01 | 4.437552E-01 |
| 62 | -4.972705E+00 | 0.000000E+00 | -3.970075E-01 | 6.018260E-01 | -9.178773E-01 |
| 71 | -3.635795E+00 | 0.000000E+00 | -2.301762E-01 | 1.322256E-01 | -1.369618E-01 |
| 72 | -2.995348E+00 | 0.000000E+00 | -1.634686E-01 | 5.848948E-02 | -7.918415E-03 |
| Surface | $a_{10}$ | $a_{12}$ | $a_{14}$ | $a_{16}$ | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 4.540768E+00 | -3.678193E+00 | 0.000000E+00 | 0.000000E+00 | |
| 51 | 0.000000E+00 | 0.000000E+00 | 0.000000E+00 | 0.000000E+00 | |
| 52 | 3.045823E-01 | -6.669369E-02 | 0.000000E+00 | 0.000000E+00 | |
| 61 | -3.683905E-01 | 2.156435E-01 | -6.266523E-02 | 0.000000E+00 | |
| 62 | 9.254229E-01 | -5.793204E-01 | 1.976043E-01 | -2.653629E-02 | |
| 71 | 1.152948E-01 | -5.813145E-02 | 1.538125E-02 | -1.635599E-03 | |
| 72 | -2.544242E-03 | 1.221260E-03 | -1.593018E-04 | 4.059330E-06 | |

FIG. 25

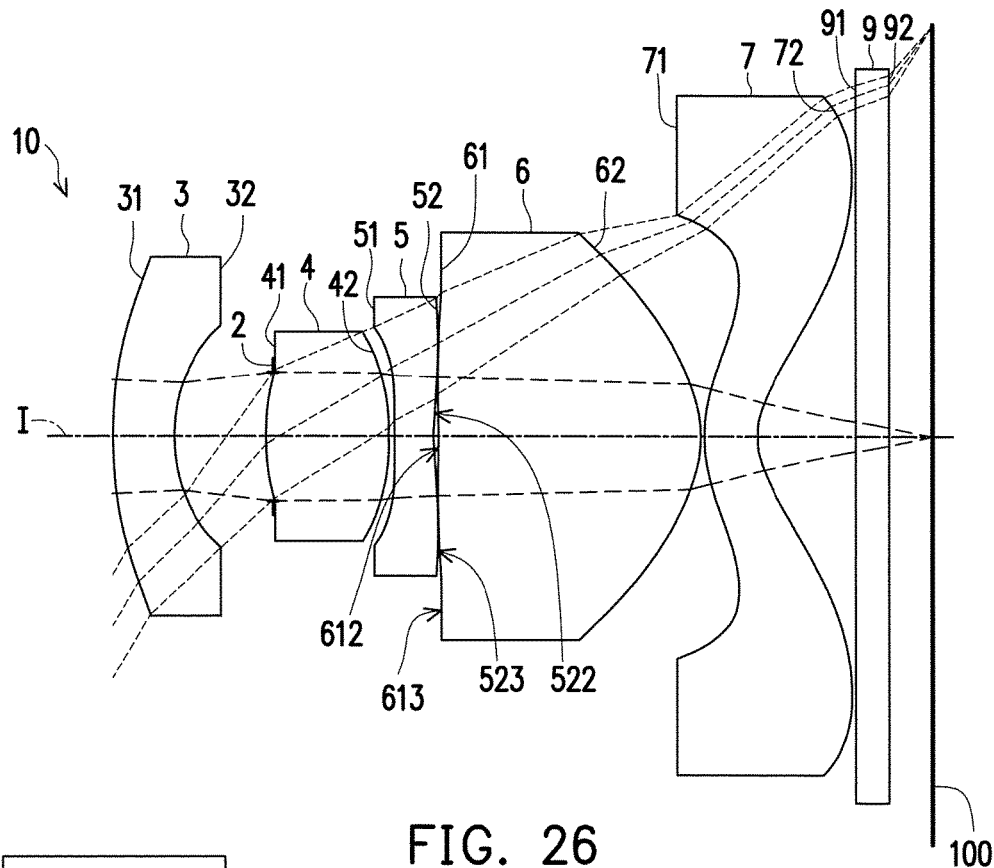
FIG. 26
```
------- 650nm
——— 555nm
—·—·— 470nm
```
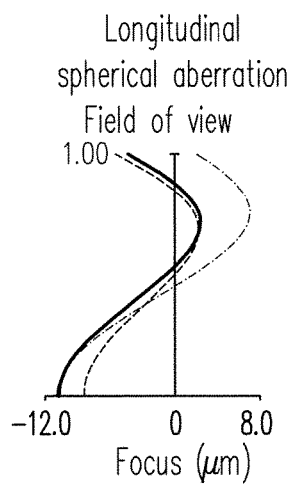
Longitudinal
spherical aberration
Field of view
FIG. 27A
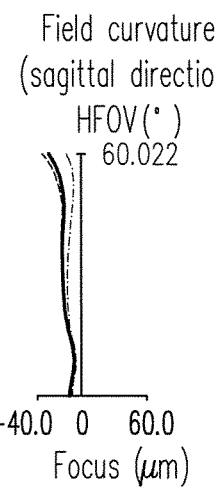
Field curvature
(sagittal direction)
HFOV(°)
FIG. 27B
Field curvature
(tangential direction)
HFOV(°)
FIG. 27C
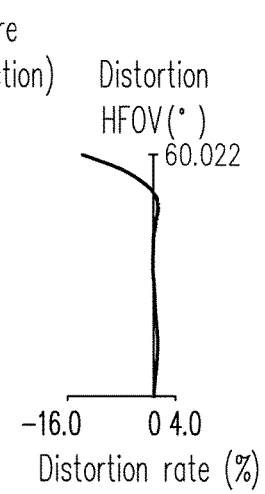
Distortion
HFOV(°)
FIG. 27D

| Sixth Embodiment |||||||||
|---|---|---|---|---|---|---|---|---|
| System Focal Length = 1.675 mm , Half Field of View =60.02°, F-Number =2.42, System Length= 5.026 mm, Image Height =2.525 mm |||||||||
| Lens Element | Surface | Surface Type | Radius of Curvature(mm) | Thickness (mm) | Material | Refractive Index (Nd) | Dispersion Coefficient (Vd) | Focal Length (mm) |
| Object | | Spheric Surface | Infinity | Infinity | | | | |
| First Lens Element 3 | Object-side surface31 | Aspheric Surface | 2.727 | 0.378 | Plastic | 1.535 | 55.712 | -3.296 |
| | Image-side surface32 | Aspheric Surface | 1.022 | 0.603 | | | | |
| Aperture stop 2 | | Spheric Surface | Infinity | -0.038 | | | | |
| Second Lens Element 4 | Object-side surface41 | Aspheric Surface | 1.792 | 0.749 | Plastic | 1.535 | 55.780 | 1.762 |
| | Image-side surface42 | Aspheric Surface | -1.712 | 0.032 | | | | |
| Third Lens Element 5 | Object-side surface51 | Aspheric Surface | 14.211 | 0.242 | Plastic | 1.642 | 22.409 | -4.400 |
| | Image-side surface52 | Aspheric Surface | 2.357 | 0.030 | | | | |
| Fourth Lens Element 6 | Object-side surface61 | Aspheric Surface | -199.231 | 1.603 | Glass | 1.553 | 71.685 | 1.425 |
| | Image-side surface62 | Aspheric Surface | -0.789 | 0.024 | | | | |
| Fifth Lens Element 7 | Object-side surface71 | Aspheric Surface | 0.951 | 0.329 | Plastic | 1.642 | 22.409 | -2.410 |
| | Image-side surface72 | Aspheric Surface | 0.511 | 0.514 | | | | |
| Filter 9 | Object-side surface91 | Spheric Surface | Infinity | 0.210 | | | | |
| | Image-side surface92 | Spheric Surface | Infinity | 0.349 | | | | |
| | Image Plane 100 | | Infinity | | | | | |

FIG. 28

| Surface | K | $a_2$ | $a_4$ | $a_6$ | $a_8$ |
|---|---|---|---|---|---|
| 31 | 1.518548E+00 | 0.000000E+00 | 1.572234E-02 | -1.163969E-02 | -1.120045E-02 |
| 32 | -1.348039E+00 | 0.000000E+00 | 2.395286E-01 | 1.672176E-01 | -9.288046E-02 |
| 41 | 6.945437E-01 | 0.000000E+00 | 2.099045E-02 | 1.521489E-01 | -2.755243E-01 |
| 42 | 2.575281E-01 | 0.000000E+00 | -3.905912E-01 | 1.069346E+00 | -2.757213E+00 |
| 51 | 0.000000E+00 | 0.000000E+00 | -9.172774E-01 | 1.125330E+00 | -1.285916E+00 |
| 52 | 1.956532E+00 | 0.000000E+00 | -5.671722E-01 | 6.142009E-01 | -5.571973E-01 |
| 61 | -1.769000E+04 | 0.000000E+00 | 6.185467E-02 | -2.419697E-01 | 4.612206E-01 |
| 62 | -4.151404E+00 | 0.000000E+00 | -3.468422E-01 | 6.046765E-01 | -9.134486E-01 |
| 71 | -1.960781E+00 | 0.000000E+00 | -2.769008E-01 | 1.258947E-01 | -1.392751E-01 |
| 72 | -2.325208E+00 | 0.000000E+00 | -1.653635E-01 | 5.807074E-02 | -7.294716E-03 |
| Surface | $a_{10}$ | $a_{12}$ | $a_{14}$ | $a_{16}$ | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 4.862661E+00 | -4.151197E+00 | 0.000000E+00 | 0.000000E+00 | |
| 51 | 0.000000E+00 | 0.000000E+00 | 0.000000E+00 | 0.000000E+00 | |
| 52 | 3.368353E-01 | -4.852297E-02 | 0.000000E+00 | 0.000000E+00 | |
| 61 | -3.779994E-01 | 1.896465E-01 | -5.663424E-02 | 0.000000E+00 | |
| 62 | 9.318081E-01 | -5.784906E-01 | 1.957963E-01 | -2.730298E-02 | |
| 71 | 1.140976E-01 | -5.928677E-02 | 1.469926E-02 | -1.927487E-03 | |
| 72 | -2.483838E-03 | 1.147834E-03 | -1.794183E-04 | 1.002754E-05 | |

FIG. 29

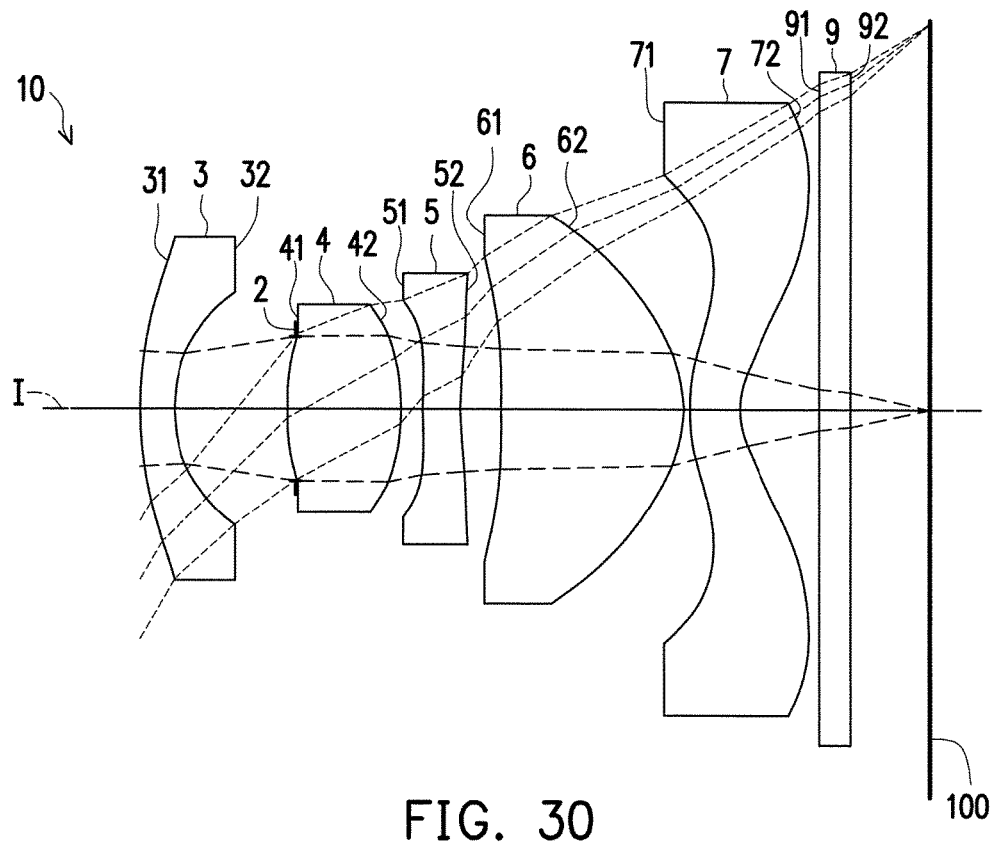
FIG. 30
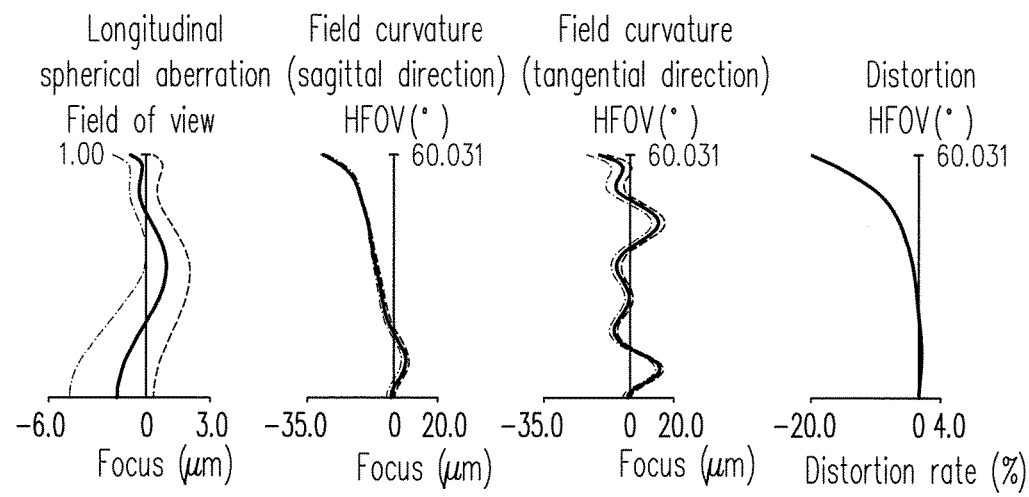
FIG. 31A   FIG. 31B   FIG. 31C   FIG. 31D

| Seventh Embodiment ||||||||
|---|---|---|---|---|---|---|---|
| System Focal Length = 1.815 mm , Half Field of View =60.023°, F-Number =2.44, System Length= 5.170 mm, Image Height =2.525 mm ||||||||
| Lens Element | Surface | Surface Type | Radius of Curvature(mm) | Thickness (mm) | Material | Refractive Index (Nd) | Dispersion Coefficient (Vd) | Focal Length (mm) |
| Object | | Spheric Surface | Infinity | Infinity | | | | |
| First Lens Element 3 | Object-side surface31 | Aspheric Surface | 2.596 | 0.221 | Plastic | 1.535 | 55.712 | -2.840 |
| | Image-side surface32 | Aspheric Surface | 0.932 | 0.795 | | | | |
| Aperture stop 2 | | Spheric Surface | Infinity | -0.055 | | | | |
| Second Lens Element 4 | Object-side surface41 | Aspheric Surface | 1.707 | 0.743 | Plastic | 1.535 | 55.780 | 1.731 |
| | Image-side surface42 | Aspheric Surface | -1.730 | 0.142 | | | | |
| Third Lens Element 5 | Object-side surface51 | Aspheric Surface | 7.502 | 0.248 | Plastic | 1.642 | 22.409 | -5.334 |
| | Image-side surface52 | Aspheric Surface | 2.334 | 0.273 | | | | |
| Fourth Lens Element 6 | Object-side surface61 | Aspheric Surface | -6.028 | 1.191 | Glass | 1.553 | 71.685 | 1.553 |
| | Image-side surface62 | Aspheric Surface | -0.807 | 0.036 | | | | |
| Fifth Lens Element 7 | Object-side surface71 | Aspheric Surface | 1.113 | 0.335 | Plastic | 1.642 | 22.409 | -2.362 |
| | Image-side surface72 | Aspheric Surface | 0.568 | 0.514 | | | | |
| Filter 9 | Object-side surface91 | Spheric Surface | Infinity | 0.210 | | | | |
| | Image-side surface92 | Spheric Surface | Infinity | 0.517 | | | | |
| | Image Plane 100 | | Infinity | | | | | |

FIG. 32

| Surface | K | $a_2$ | $a_4$ | $a_6$ | $a_8$ |
|---|---|---|---|---|---|
| 31 | 2.173210E+00 | 0.000000E+00 | 7.305220E-03 | -3.743606E-02 | -3.368461E-03 |
| 32 | -1.263529E+00 | 0.000000E+00 | 2.380649E-01 | 1.173125E-01 | -2.569680E-02 |
| 41 | -5.881157E-01 | 0.000000E+00 | -1.009533E-02 | 6.232612E-02 | -6.853701E-01 |
| 42 | 8.358494E-01 | 0.000000E+00 | -3.948457E-01 | 9.648611E-01 | -2.968558E+00 |
| 51 | 0.000000E+00 | 0.000000E+00 | -8.485692E-01 | 9.940751E-01 | -1.129777E+00 |
| 52 | 3.051502E+00 | 0.000000E+00 | -5.538003E-01 | 6.719475E-01 | -5.457918E-01 |
| 61 | 1.911638E+01 | 0.000000E+00 | 4.847624E-02 | -2.870959E-01 | 4.379032E-01 |
| 62 | -4.676697E+00 | 0.000000E+00 | -3.709439E-01 | 5.895409E-01 | -9.161345E-01 |
| 71 | -2.581292E+00 | 0.000000E+00 | -2.887739E-01 | 1.485725E-01 | -1.352497E-01 |
| 72 | -2.946679E+00 | 0.000000E+00 | -1.578975E-01 | 5.790930E-02 | -7.633016E-03 |
| Surface | $a_{10}$ | $a_{12}$ | $a_{14}$ | $a_{16}$ | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 4.680809E+00 | -4.039852E+00 | 0.000000E+00 | 0.000000E+00 | |
| 51 | 0.000000E+00 | 0.000000E+00 | 0.000000E+00 | 0.000000E+00 | |
| 52 | 2.966834E-01 | -8.872079E-02 | 0.000000E+00 | 0.000000E+00 | |
| 61 | -3.552676E-01 | 2.250611E-01 | -7.809284E-02 | 0.000000E+00 | |
| 62 | 9.314117E-01 | -5.787068E-01 | 1.958782E-01 | -2.692714E-02 | |
| 71 | 1.138117E-01 | -5.870477E-02 | 1.538420E-02 | -1.543209E-03 | |
| 72 | -2.516004E-03 | 1.154581E-03 | -1.769865E-04 | 1.019313E-05 | |

FIG. 33

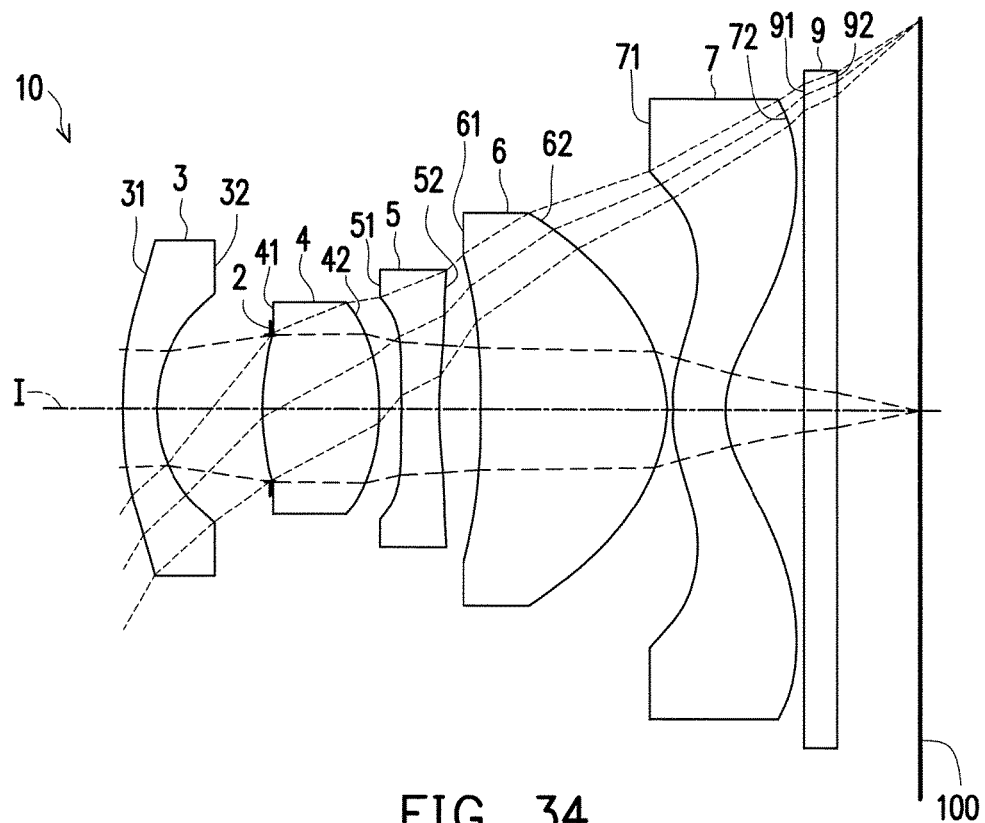
FIG. 34
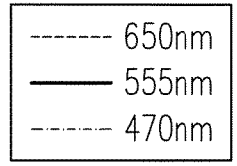
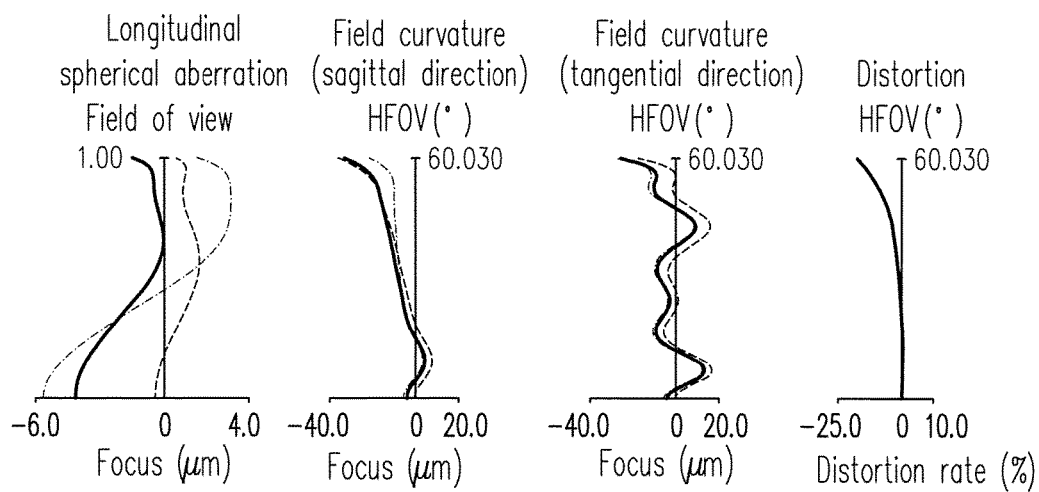
FIG. 35A  FIG. 35B  FIG. 35C  FIG. 35D

| Eighth Embodiment |||||||||
|---|---|---|---|---|---|---|---|---|
| System Focal Length = 1.839 mm , Half Field of View =60.03°, F-Number =2.44, System Length= 5.170 mm, Image Height =2.525 mm |||||||||
| Lens Element | Surface | Surface Type | Radius of Curvature(mm) | Thickness (mm) | Material | Refractive Index (Nd) | Dispersion Coefficient (Vd) | Focal Length (mm) |
| Object | | Spheric Surface | Infinity | Infinity | | | | |
| First Lens Element 3 | Object-side surface31 | Aspheric Surface | 2.629 | 0.222 | Plastic | 1.535 | 55.712 | -2.821 |
| | Image-side surface32 | Aspheric Surface | 0.933 | 0.730 | | | | |
| Aperture stop 2 | | Spheric Surface | Infinity | -0.050 | | | | |
| Second Lens Element 4 | Object-side surface41 | Aspheric Surface | 1.740 | 0.747 | Plastic | 1.535 | 55.780 | 1.730 |
| | Image-side surface42 | Aspheric Surface | -1.693 | 0.142 | | | | |
| Third Lens Element 5 | Object-side surface51 | Aspheric Surface | 7.709 | 0.245 | Plastic | 1.642 | 22.409 | -5.447 |
| | Image-side surface52 | Aspheric Surface | 2.389 | 0.271 | | | | |
| Fourth Lens Element 6 | Object-side surface61 | Aspheric Surface | -5.804 | 1.194 | Glass | 1.553 | 71.685 | 1.544 |
| | Image-side surface62 | Aspheric Surface | -0.801 | 0.038 | | | | |
| Fifth Lens Element 7 | Object-side surface71 | Aspheric Surface | 1.118 | 0.338 | Plastic | 1.642 | 22.409 | -2.329 |
| | Image-side surface72 | Aspheric Surface | 0.566 | 0.514 | | | | |
| Filter 9 | Object-side surface91 | Spheric Surface | Infinity | 0.210 | | | | |
| | Image-side surface92 | Spheric Surface | Infinity | 0.531 | | | | |
| | Image Plane 100 | | Infinity | | | | | |

FIG. 36

| Surface | K | $a_2$ | $a_4$ | $a_6$ | $a_8$ |
|---|---|---|---|---|---|
| 31 | 2.454808E+00 | 0.000000E+00 | 4.864234E-03 | -4.001171E-02 | -4.036089E-03 |
| 32 | -1.239994E+00 | 0.000000E+00 | 2.428633E-01 | 1.231776E-01 | -1.632228E-02 |
| 41 | -5.285361E-01 | 0.000000E+00 | -8.199747E-03 | 5.628303E-02 | -6.579215E-01 |
| 42 | 7.794488E-01 | 0.000000E+00 | -3.919217E-01 | 9.656257E-01 | -2.967100E+00 |
| 51 | 0.000000E+00 | 0.000000E+00 | -8.402934E-01 | 9.947398E-01 | -1.120213E+00 |
| 52 | 3.161897E+00 | 0.000000E+00 | -5.537187E-01 | 6.735366E-01 | -5.453208E-01 |
| 61 | 1.991920E+01 | 0.000000E+00 | 4.638684E-02 | -2.883564E-01 | 4.401852E-01 |
| 62 | -4.636282E+00 | 0.000000E+00 | -3.730540E-01 | 5.886303E-01 | -9.158570E-01 |
| 71 | -2.491281E+00 | 0.000000E+00 | -2.888324E-01 | 1.504264E-01 | -1.351267E-01 |
| 72 | -2.923620E+00 | 0.000000E+00 | -1.551938E-01 | 5.754818E-02 | -7.655494E-03 |
| Surface | $a_{10}$ | $a_{12}$ | $a_{14}$ | $a_{16}$ | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 4.693382E+00 | -3.981865E+00 | 0.000000E+00 | 0.000000E+00 | |
| 51 | 0.000000E+00 | 0.000000E+00 | 0.000000E+00 | 0.000000E+00 | |
| 52 | 2.958601E-01 | -8.906960E-02 | 0.000000E+00 | 0.000000E+00 | |
| 61 | -3.520751E-01 | 2.260574E-01 | -8.048518E-02 | 0.000000E+00 | |
| 62 | 9.314357E-01 | -5.789140E-01 | 1.957500E-01 | -2.688841E-02 | |
| 71 | 1.137281E-01 | -5.872705E-02 | 1.538148E-02 | -1.545236E-03 | |
| 72 | -2.511539E-03 | 1.156543E-03 | -1.767569E-04 | 1.011504E-05 | |

FIG. 37

| Ninth Embodiment |||||||||
|---|---|---|---|---|---|---|---|---|
| System Focal Length = 1.821 mm , Half Field of View =59.98°, F-Number =2.44, System Length= 5.295 mm, Image Height =2.525 mm |||||||||
| Lens Element | Surface | Surface Type | Radius of Curvature(mm) | Thickness (mm) | Material | Refractive Index (Nd) | Dispersion Coefficient (Vd) | Focal Length (mm) |
| Object | | Spheric Surface | Infinity | Infinity | | | | |
| First Lens Element 3 | Object-side surface31 | Aspheric Surface | 2.150 | 0.365 | Plastic | 1.535 | 55.712 | -3.465 |
| | Image-side surface32 | Aspheric Surface | 0.898 | 0.909 | | | | |
| Aperture stop 2 | | Spheric Surface | Infinity | -0.050 | | | | |
| Second Lens Element 4 | Object-side surface41 | Aspheric Surface | 1.757 | 0.803 | Plastic | 1.535 | 55.780 | 1.778 |
| | Image-side surface42 | Aspheric Surface | -1.757 | 0.109 | | | | |
| Third Lens Element 5 | Object-side surface51 | Aspheric Surface | 6.664 | 0.230 | Plastic | 1.642 | 22.409 | -6.387 |
| | Image-side surface52 | Aspheric Surface | 2.517 | 0.510 | | | | |
| Fourth Lens Element 6 | Object-side surface61 | Aspheric Surface | -5.708 | 1.057 | Glass | 1.553 | 71.685 | 1.466 |
| | Image-side surface62 | Aspheric Surface | -0.759 | 0.029 | | | | |
| Fifth Lens Element 7 | Object-side surface71 | Aspheric Surface | 1.268 | 0.372 | Plastic | 1.642 | 22.409 | -1.933 |
| | Image-side surface72 | Aspheric Surface | 0.557 | 0.480 | | | | |
| Filter 9 | Object-side surface91 | Spheric Surface | Infinity | 0.166 | | | | |
| | Image-side surface92 | Spheric Surface | Infinity | 0.315 | | | | |
| Image Plane 100 | | | Infinity | | | | | |

FIG. 40

| Surface | K | $a_2$ | $a_4$ | $a_6$ | $a_8$ |
|---|---|---|---|---|---|
| 31 | 9.463341E-01 | 1.965301E-02 | -2.309670E-04 | -3.591877E-02 | -2.543525E-03 |
| 32 | -1.324608E+00 | 0.000000E+00 | 2.424427E-01 | 6.277396E-02 | -1.961257E-01 |
| 41 | 9.224041E-03 | 0.000000E+00 | 1.221775E-02 | 7.767131E-04 | -5.802057E-01 |
| 42 | 1.441920E+00 | 0.000000E+00 | -4.646615E-01 | 1.214451E+00 | -3.097677E+00 |
| 51 | -3.782852E+02 | 0.000000E+00 | -8.578481E-01 | 8.645932E-01 | -1.350335E+00 |
| 52 | 1.731919E+00 | 0.000000E+00 | -5.720048E-01 | 6.340421E-01 | -5.752227E-01 |
| 61 | 1.925935E+01 | 0.000000E+00 | 9.006658E-02 | -2.535117E-01 | 3.921362E-01 |
| 62 | -4.585622E+00 | 0.000000E+00 | -3.528556E-01 | 5.927914E-01 | -9.149853E-01 |
| 71 | -2.919575E+00 | 0.000000E+00 | -2.988601E-01 | 1.484596E-01 | -1.344864E-01 |
| 72 | -3.233274E+00 | 0.000000E+00 | -1.444915E-01 | 5.311442E-02 | -7.154084E-03 |
| Surface | $a_{10}$ | $a_{12}$ | $a_{14}$ | $a_{16}$ | |
| 31 | -7.825691E-04 | 0.000000E+00 | 0.000000E+00 | 0.000000E+00 | |
| 32 | 2.415254E-01 | 1.529275E-01 | -7.304183E-01 | 3.704349E-01 | |
| 41 | 7.900221E-01 | -1.121494E+00 | 2.040722E+00 | -2.455092E+01 | |
| 42 | 3.625041E+00 | -3.493887E+00 | 2.723101E+00 | -3.363937E+00 | |
| 51 | -2.246383E-01 | 8.770750E-02 | 3.484728E-01 | -4.249938E+00 | |
| 52 | 2.269507E-01 | -6.022658E-02 | 1.104275E-01 | -6.780334E-02 | |
| 61 | -3.686373E-01 | 2.310314E-01 | -8.188955E-02 | 1.250314E-02 | |
| 62 | 9.323069E-01 | -5.774162E-01 | 1.961072E-01 | -2.719023E-02 | |
| 71 | 1.132705E-01 | -5.918287E-02 | 1.543249E-02 | -1.476586E-03 | |
| 72 | -2.415772E-03 | 1.133440E-03 | -1.829087E-04 | 1.122561E-05 | |

FIG. 41

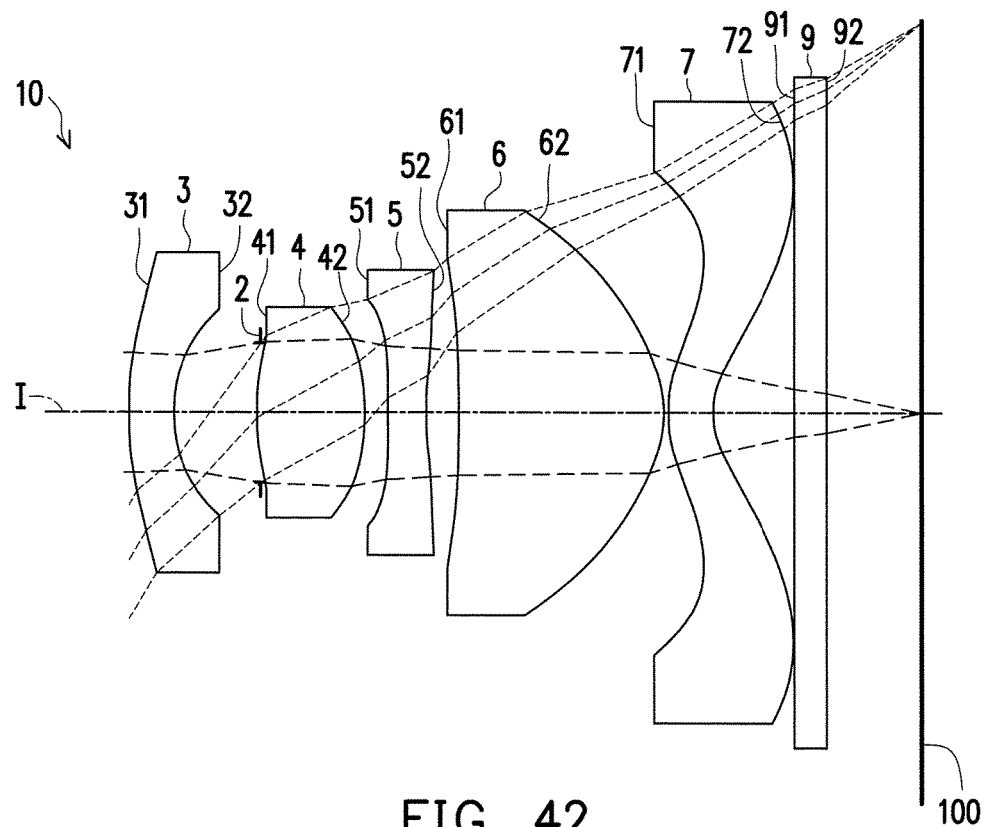
FIG. 42
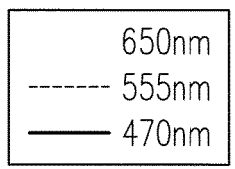
FIG. 43A  FIG. 43B  FIG. 43C  FIG. 43D
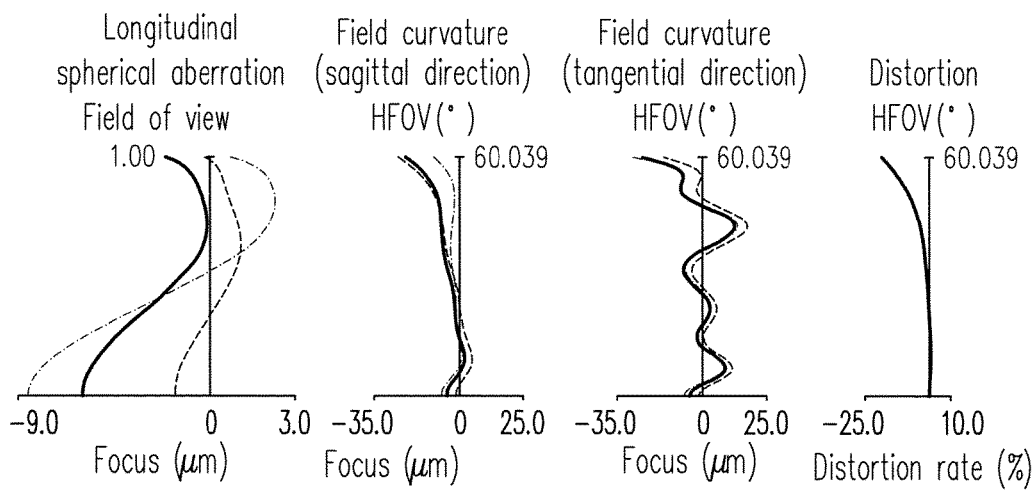

| Tenth Embodiment |||||||||
|---|---|---|---|---|---|---|---|---|
| System Focal Length = 1.872 mm, Half Field of View =60.04°, F-Number =2.43, System Length= 5.109 mm, Image Height =2.525 mm |||||||||
| Lens Element | Surface | Surface Type | Radius of Curvature(mm) | Thickness (mm) | Material | Refractive Index (Nd) | Dispersion Coefficient (Vd) | Focal Length (mm) |
| Object | | Spheric Surface | Infinity | Infinity | | | | |
| First Lens Element 3 | Object-side surface31 | Aspheric Surface | 2.846 | 0.288 | Plastic | 1.535 | 55.712 | -2.810 |
| | Image-side surface32 | Aspheric Surface | 0.952 | 0.570 | | | | |
| Aperture stop 2 | | Spheric Surface | Infinity | -0.033 | | | | |
| Second Lens Element 4 | Object-side surface41 | Aspheric Surface | 1.898 | 0.694 | Plastic | 1.535 | 55.780 | 1.779 |
| | Image-side surface42 | Aspheric Surface | -1.677 | 0.147 | | | | |
| Third Lens Element 5 | Object-side surface51 | Aspheric Surface | 6.419 | 0.249 | Plastic | 1.642 | 22.409 | -5.466 |
| | Image-side surface52 | Aspheric Surface | 2.246 | 0.210 | | | | |
| Fourth Lens Element 6 | Object-side surface61 | Aspheric Surface | -7.969 | 1.325 | Glass | 1.553 | 71.685 | 1.501 |
| | Image-side surface62 | Aspheric Surface | -0.798 | 0.029 | | | | |
| Fifth Lens Element 7 | Object-side surface71 | Aspheric Surface | 0.880 | 0.285 | Plastic | 1.642 | 22.409 | -2.462 |
| | Image-side surface72 | Aspheric Surface | 0.494 | 0.524 | | | | |
| Filter 9 | Object-side surface91 | Spheric Surface | Infinity | 0.210 | | | | |
| | Image-side surface92 | Spheric Surface | Infinity | 0.610 | | | | |
| | Image Plane 100 | | Infinity | | | | | |

FIG. 44

| Surface | K | $a_2$ | $a_4$ | $a_6$ | $a_8$ |
|---|---|---|---|---|---|
| 31 | 3.081031E+00 | 0.000000E+00 | 5.926256E-03 | -3.686818E-02 | -7.296994E-03 |
| 32 | -1.174940E+00 | 0.000000E+00 | 2.540862E-01 | 1.444386E-01 | 3.817456E-02 |
| 41 | -3.067784E-01 | 0.000000E+00 | -1.651769E-03 | 1.177833E-02 | -6.017795E-01 |
| 42 | 9.192777E-01 | 0.000000E+00 | -3.971958E-01 | 9.532123E-01 | -2.944889E+00 |
| 51 | 0.000000E+00 | 0.000000E+00 | -8.481935E-01 | 1.013898E+00 | -1.050106E+00 |
| 52 | 2.421875E+00 | 0.000000E+00 | -5.654399E-01 | 6.738372E-01 | -5.400462E-01 |
| 61 | 1.699953E+01 | 0.000000E+00 | 5.357487E-02 | -2.803306E-01 | 4.404990E-01 |
| 62 | -4.578098E+00 | 0.000000E+00 | -3.643178E-01 | 5.972716E-01 | -9.192065E-01 |
| 71 | -2.731268E+00 | 0.000000E+00 | -2.439464E-01 | 1.309328E-01 | -1.369787E-01 |
| 72 | -2.549530E+00 | 0.000000E+00 | -1.648405E-01 | 5.842591E-02 | -7.800046E-03 |
| Surface | $a_{10}$ | $a_{12}$ | $a_{14}$ | $a_{16}$ | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |
| 41 | 0.000000E+00 | 0.000000E+00 | 0.000000E+00 | 0.000000E+00 | |
| 42 | 4.799263E+00 | -4.277786E+00 | 0.000000E+00 | 0.000000E+00 | |
| 51 | 0.000000E+00 | 0.000000E+00 | 0.000000E+00 | 0.000000E+00 | |
| 52 | 3.022321E-01 | -9.858944E-02 | 0.000000E+00 | 0.000000E+00 | |
| 61 | -3.612955E-01 | 2.194858E-01 | -7.690152E-02 | 0.000000E+00 | |
| 62 | 9.308165E-01 | -5.778410E-01 | 1.961733E-01 | -2.744095E-02 | |
| 71 | 1.149379E-01 | -5.834665E-02 | 1.536828E-02 | -1.601114E-03 | |
| 72 | -2.499944E-03 | 1.167619E-03 | -1.754775E-04 | 9.373087E-06 | |

FIG. 45

| Condition Expressions | First Embodiment | Second Embodiment | Third Embodiment | Fourth Embodiment | Fifth Embodiment |
|---|---|---|---|---|---|
| T1 | 0.397 | 0.570 | 0.320 | 0.199 | 0.205 |
| G12 | 0.722 | 0.599 | 0.990 | 0.524 | 0.537 |
| T2 | 0.682 | 1.154 | 1.025 | 0.631 | 0.688 |
| G23 | 0.137 | 0.045 | 0.025 | 0.190 | 0.141 |
| T3 | 0.232 | 0.228 | 0.230 | 0.249 | 0.250 |
| G34 | 0.232 | 0.068 | 0.374 | 0.180 | 0.285 |
| T4 | 1.240 | 1.044 | 1.033 | 1.308 | 0.999 |
| G45 | 0.037 | 0.040 | 0.040 | 0.026 | 0.021 |
| T5 | 0.367 | 0.286 | 0.370 | 0.245 | 0.239 |
| G5F | 0.514 | 0.514 | 0.512 | 0.514 | 0.514 |
| TF | 0.210 | 0.210 | 0.210 | 0.210 | 0.210 |
| GFP | 0.731 | 0.739 | 0.575 | 0.539 | 1.000 |
| EFL | 1.924 | 2.132 | 1.934 | 1.758 | 1.980 |
| TL | 4.045 | 4.035 | 4.407 | 3.552 | 3.366 |
| BFL | 1.455 | 1.463 | 1.297 | 1.263 | 1.724 |
| ALT | 2.918 | 3.283 | 2.978 | 2.632 | 2.382 |
| Gaa | 1.128 | 0.752 | 1.429 | 0.920 | 0.984 |
| TTL | 5.501 | 5.497 | 5.704 | 4.815 | 5.090 |
| $T_{min}$ | 0.232 | 0.228 | 0.230 | 0.199 | 0.205 |

FIG. 46

| Condition Expressions | First Embodiment | Second Embodiment | Third Embodiment | Fourth Embodiment | Fifth Embodiment |
|---|---|---|---|---|---|
| (T1+G12+T4)/(G23+G45+T5) | 4.364 | 5.950 | 5.386 | 4.404 | 4.341 |
| (T2+T4)/$T_{min}$ | 8.271 | 9.632 | 8.948 | 9.756 | 8.219 |
| ALT/(T3+T5) | 4.870 | 6.380 | 4.964 | 5.328 | 4.868 |
| TL/G12 | 5.603 | 6.736 | 4.452 | 6.779 | 6.269 |
| TTL/(T3+T5) | 9.181 | 10.684 | 9.507 | 9.748 | 10.405 |
| TTL/(G23+T3+G45+T5) | 7.117 | 9.160 | 8.578 | 6.778 | 7.813 |
| TL/(G23+T3+G45+T5) | 5.234 | 6.723 | 6.628 | 5.001 | 5.166 |
| TL/(T3+G45+T5) | 6.360 | 7.273 | 6.887 | 6.832 | 6.600 |
| ALT/(G23+T3+G45+T5) | 3.775 | 5.470 | 4.478 | 3.705 | 3.655 |
| TL/(T3+T5) | 6.752 | 7.842 | 7.346 | 7.192 | 6.881 |
| TTL/G12 | 7.618 | 9.178 | 5.762 | 9.189 | 9.479 |
| TTL/(G23+T3+T5) | 7.474 | 9.818 | 9.127 | 7.036 | 8.071 |
| TL/(G23+G45+T5) | 7.485 | 10.848 | 10.132 | 7.705 | 8.390 |
| TL/EFL | 2.103 | 1.893 | 2.279 | 2.021 | 1.700 |
| ALT/(G12+G45) | 3.844 | 5.135 | 2.891 | 4.784 | 4.270 |
| ALT/(G23+G45+T5) | 5.398 | 8.825 | 6.846 | 5.708 | 5.937 |
| ALT/(T3+G45+T5) | 4.587 | 5.917 | 4.653 | 5.061 | 4.670 |

FIG. 47

| Conditional Expression | Sixth Embodiment | Seventh Embodiment | Eighth Embodiment | Ninth Embodiment | Tenth Embodiment |
|---|---|---|---|---|---|
| T1 | 0.378 | 0.221 | 0.222 | 0.365 | 0.288 |
| G12 | 0.565 | 0.740 | 0.680 | 0.859 | 0.537 |
| T2 | 0.749 | 0.743 | 0.747 | 0.803 | 0.694 |
| G23 | 0.032 | 0.142 | 0.142 | 0.109 | 0.147 |
| T3 | 0.242 | 0.248 | 0.245 | 0.230 | 0.249 |
| G34 | 0.030 | 0.273 | 0.271 | 0.510 | 0.210 |
| T4 | 1.603 | 1.191 | 1.194 | 1.057 | 1.325 |
| G45 | 0.024 | 0.036 | 0.038 | 0.029 | 0.029 |
| T5 | 0.329 | 0.335 | 0.338 | 0.372 | 0.285 |
| G5F | 0.514 | 0.514 | 0.514 | 0.480 | 0.524 |
| TF | 0.210 | 0.210 | 0.210 | 0.166 | 0.210 |
| GFP | 0.349 | 0.517 | 0.531 | 0.315 | 0.610 |
| EFL | 1.675 | 1.815 | 1.839 | 1.821 | 1.872 |
| TL | 3.953 | 3.929 | 3.877 | 4.334 | 3.765 |
| BFL | 1.073 | 1.241 | 1.255 | 0.961 | 1.344 |
| ALT | 3.302 | 2.738 | 2.747 | 2.827 | 2.842 |
| Gaa | 0.651 | 1.191 | 1.130 | 1.507 | 0.923 |
| TTL | 5.026 | 5.170 | 5.132 | 5.295 | 5.108 |
| $T_{min}$ | 0.242 | 0.221 | 0.222 | 0.230 | 0.249 |

FIG. 48

| Conditional Expression | Sixth Embodiment | Seventh Embodiment | Eighth Embodiment | Ninth Embodiment | Tenth Embodiment |
|---|---|---|---|---|---|
| (T1+G12+T4)/(G23+G45+T5) | 6.610 | 4.198 | 4.049 | 4.475 | 4.662 |
| (T2+T4)/$T_{min}$ | 9.717 | 8.731 | 8.729 | 8.100 | 8.100 |
| ALT/(T3+T5) | 5.783 | 4.700 | 4.710 | 4.700 | 5.316 |
| TL/G12 | 6.997 | 5.310 | 5.702 | 5.045 | 7.000 |
| TTL/(T3+T5) | 8.803 | 8.875 | 8.801 | 8.804 | 9.557 |
| TTL/(G23+T3+G45+T5) | 8.012 | 6.799 | 6.726 | 7.161 | 7.190 |
| TL/(G23+T3+G45+T5) | 6.301 | 5.167 | 5.082 | 5.861 | 5.299 |
| TL/(T3+G45+T5) | 6.640 | 6.356 | 6.240 | 6.871 | 6.678 |
| ALT/(G23+T3+G45+T5) | 5.263 | 3.601 | 3.600 | 3.823 | 4.000 |
| TL/(T3+T5) | 6.924 | 6.745 | 6.649 | 7.206 | 7.043 |
| TTL/G12 | 8.895 | 6.986 | 7.548 | 6.164 | 9.500 |
| TTL/(G23+T3+T5) | 8.336 | 7.134 | 7.081 | 7.457 | 7.499 |
| TL/(G23+G45+T5) | 10.262 | 7.663 | 7.489 | 8.501 | 8.163 |
| TL/EFL | 2.360 | 2.165 | 2.108 | 2.380 | 2.011 |
| ALT/(G12+G45) | 5.600 | 3.530 | 3.825 | 3.182 | 5.019 |
| ALT/(G23+G45+T5) | 8.571 | 5.340 | 5.306 | 5.545 | 6.162 |
| ALT/(T3+G45+T5) | 5.546 | 4.429 | 4.421 | 4.481 | 5.041 |

FIG. 49

OPTICAL IMAGING LENS

CROSS-REFERENCE TO RELATED APPLICATION

This application claims the priority benefit of China application serial no. 201710725663.3, filed on Aug. 22, 2017. The entirety of the above-mentioned patent application is hereby incorporated by reference herein and made a part of this specification.

BACKGROUND OF THE INVENTION

1. Field of the Invention

The invention relates to an optical element. More particularly, the invention relates to an optical imaging lens.

2. Description of Related Art

The specification of the consumer electronic products is ever changing, and as the pursuit for lightweight and compact sizes continues, the structure of the lens elements for image-taking and recording is intended to be designed as light and compact. Nevertheless, owing to large distance between the object-side surface of the first lens element and the image plane of the optical imaging lens along the optical axis, the optical imaging lens of the current stage are disadvantageous to the slim design of mobile phones, digital cameras, and automotive cameras. In addition, when the electronic devices are used in different environments, temperature differences in the different environments may cause shifts in positions in which optical imaging lens are focused on, and imaging quality is thereby affected. Therefore, thermal stability of the optical imaging lens is intended to be maintained by people having ordinary skill in the art, in other words, system focus shifts of the optical imaging lens may be less susceptible to temperature changes. In view of the foregoing problems, how to design an optical imaging lens with good imaging quality, shorter lens length, and thermal stability is designed has been a goal for persons skilled in the art.

SUMMARY OF THE INVENTION

The invention provides an optical imaging lens which achieves good optical properties, enlarges a field of view angle, and has good thermal stability performance.

In an embodiment of the invention, an optical imaging lens includes a first lens element, a second lens element, a third lens element, a fourth lens element, and a fifth lens element arranged in a sequence from an object side to an image side along an optical axis. Each of the first lens element to the fifth lens element includes an object-side surface facing the object side and allowing imaging rays to pass through and an image-side surface facing the image side and allowing the imaging rays to pass through. The first lens element has negative refractive power. The object-side surface of the first lens element has a convex portion in a vicinity of the optical axis. The object-side surface of the second lens element has a convex portion in a vicinity of a periphery. The image-side surface of the second lens element has a convex portion in the vicinity of the optical axis. The image-side surface of the third lens element has a concave portion in the vicinity of the optical axis. The image-side surface of the fourth lens element has a convex portion in the vicinity of the periphery. The object-side surface of the fifth lens element has a concave portion in the vicinity of the periphery. The optical imaging lens includes at least one piece of the lens elements with a material satisfying a condition expression of $|dn/dt| \leq 8.500 \times 10^{-6}/°$ C. and at least one piece of the lens elements with a material of plastic. Among the lens elements of the optical imaging lens, only the aforementioned five lens elements have refractive power, and the optical imaging lens satisfies: $(T1+G12+T4)/(G23+G45+T5) \geq 4.000$, wherein T1 is a central thickness of the first lens element along the optical axis, T4 is a central thickness of the fourth lens element along the optical axis, T5 is a central thickness of the fifth lens element along the optical axis, G12 is an air gap between the first lens element and the second lens element along the optical axis, G23 is an air gap between the second lens element and the third lens element along the optical axis, G45 is an air gap between the fourth lens element and the fifth lens element along the optical axis, and $|dn/dt|$ is an absolute value of a temperature coefficient of refractive index.

In an embodiment of the invention, an optical imaging lens includes a first lens element, a second lens element, a third lens element, a fourth lens element, and a fifth lens element arranged in a sequence from an object side to an image side along an optical axis. Each of the first lens element to the fifth lens element includes an object-side surface facing the object side and allowing imaging rays to pass through and an image-side surface facing the image side and allowing the imaging rays to pass through. The first lens element has negative refractive power. The object-side surface of the first lens element has a convex portion in a vicinity of a periphery, and the first lens element is made of plastic. The object-side surface of the second lens element has a convex portion in a vicinity of a periphery, and the image-side surface of the second lens element has a convex portion in the vicinity of the optical axis. The image-side surface of the third lens element has a concave portion in the vicinity of the optical axis. The image-side surface of the fourth lens element has a convex portion in the vicinity of the periphery. The object-side surface of the fifth lens element has a concave portion in the vicinity of the periphery. The optical imaging lens includes at least one piece of the lens elements with a material satisfying a condition expression of $|dn/dt| \leq 8.500 \times 10^{-6}/°$ C. Among the lens elements of the optical imaging lens, only the aforementioned five lens elements have refractive power and the optical imaging lens satisfies: $(T1+G12+T4)/(G23+G45+T5) \geq 3.700$, wherein T1 is a central thickness of the first lens element along the optical axis, T4 is a central thickness of the fourth lens element along the optical axis, T5 is a central thickness of the fifth lens element along the optical axis, G12 is an air gap between the first lens element and the second lens element along the optical axis, G23 is an air gap between the second lens element and the third lens element along the optical axis, G45 is an air gap between the fourth lens element and the fifth lens element along the optical axis, and $|dn/dt|$ is an absolute value of a temperature coefficient of refractive index.

Based on the above, in the embodiments of the invention, the optical imaging lens can bring the following advantageous effect. With the combination of refractive power of the lens elements and arrangement of the concave and convex curvatures of each of the lens elements, under the circumstances where the condition expressions are satisfied, the optical imaging lens can maintain good optical properties, enlarge a field of view angle, and have good thermal stability performance.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic view illustrating a surface structure of a lens element.

FIG. 2 is a schematic view illustrating a concave and convex surface structure of a lens element and a ray focus.

FIG. 3 is a schematic view illustrating a surface structure of a lens element according to a first example.

FIG. 4 is a schematic view illustrating a surface structure of a lens element according to a second example.

FIG. 5 is a schematic view illustrating a surface structure of a lens element according to a third example.

FIG. 6 is a schematic view illustrating an optical imaging lens according to a first embodiment of the invention.

FIGS. 7A to 7D are diagrams illustrating longitudinal spherical aberration and other aberrations of the optical imaging lens according to the first embodiment of the invention.

FIG. 8 shows detailed optical data pertaining to the optical imaging lens according to the first embodiment of the invention.

FIG. 9 shows aspheric parameters pertaining to the optical imaging lens according to the first embodiment of the invention.

FIG. 10 is a schematic view illustrating an optical imaging lens according to a second embodiment of the invention.

FIGS. 11A to 11D are diagrams illustrating longitudinal spherical aberration and other aberrations of the optical imaging lens according to the second embodiment of the invention.

FIG. 12 shows detailed optical data pertaining to the optical imaging lens according to the second embodiment of the invention.

FIG. 13 shows aspheric parameters pertaining to the optical imaging lens according to the second embodiment of the invention.

FIG. 14 is a schematic view illustrating an optical imaging lens according to a third embodiment of the invention.

FIGS. 15A to 15D are diagrams illustrating longitudinal spherical aberration and other aberrations of the optical imaging lens according to the third embodiment of the invention.

FIG. 16 shows detailed optical data pertaining to the optical imaging lens according to the third embodiment of the invention.

FIG. 17 shows aspheric parameters pertaining to the optical imaging lens according to the third embodiment of the invention.

FIG. 18 is a schematic view illustrating an optical imaging lens according to a fourth embodiment of the invention.

FIGS. 19A to 19D are diagrams illustrating longitudinal spherical aberration and other aberrations of the optical imaging lens according to the fourth embodiment of the invention.

FIG. 20 shows detailed optical data of the optical imaging lens according to the fourth embodiment of the invention.

FIG. 21 shows aspheric parameters of the optical imaging lens according to the fourth embodiment of the invention.

FIG. 22 is a schematic view illustrating an optical imaging lens according to a fifth embodiment of the invention.

FIGS. 23A to 23D are diagrams illustrating longitudinal spherical aberration and other aberrations of the optical imaging lens according to the fifth embodiment of the invention.

FIG. 24 shows detailed optical data of the optical imaging lens according to the fifth embodiment of the invention.

FIG. 25 shows aspheric parameters of the optical imaging lens according to the fifth embodiment of the invention.

FIG. 26 is a schematic view illustrating an optical imaging lens according to a sixth embodiment of the invention.

FIGS. 27A to 27D are diagrams illustrating longitudinal spherical aberration and other aberrations of the optical imaging lens according to the sixth embodiment of the invention.

FIG. 28 shows detailed optical data of the optical imaging lens according to the sixth embodiment of the invention.

FIG. 29 shows aspheric parameters of the optical imaging lens according to the sixth embodiment of the invention.

FIG. 30 is a schematic view illustrating an optical imaging lens according to a seventh embodiment of the invention.

FIGS. 31A to 31D are diagrams illustrating longitudinal spherical aberration and other aberrations of the optical imaging lens according to the seventh embodiment of the invention.

FIG. 32 shows detailed optical data of the optical imaging lens according to the seventh embodiment of the invention.

FIG. 33 shows aspheric parameters of the optical imaging lens according to the seventh embodiment of the invention.

FIG. 34 is a schematic view illustrating an optical imaging lens according to an eighth embodiment of the invention.

FIGS. 35A to 35D are diagrams illustrating longitudinal spherical aberration and other aberrations of the optical imaging lens according to the eighth embodiment of the invention.

FIG. 36 shows detailed optical data of the optical imaging lens according to the eighth embodiment of the invention.

FIG. 37 shows aspheric parameters of the optical imaging lens according to the eighth embodiment of the invention.

FIG. 40 shows detailed optical data of the optical imaging lens according to the ninth embodiment of the invention.

FIG. 41 shows aspheric parameters of the optical imaging lens according to the ninth embodiment of the invention.

FIG. 42 is a schematic view illustrating an optical imaging lens according to a tenth embodiment of the invention.

FIGS. 43A to 43D are diagrams illustrating longitudinal spherical aberration and other aberrations of the optical imaging lens according to the tenth embodiment of the invention.

FIG. 44 shows detailed optical data of the optical imaging lens according to the tenth embodiment of the invention.

FIG. 45 shows aspheric parameters of the optical imaging lens according to the tenth embodiment of the invention.

FIG. 46 and FIG. 47 show important parameters and relation values thereof pertaining to the optical imaging lens according to the first through the fifth embodiments of the invention.

FIG. 48 and FIG. 49 show important parameters and relation values thereof pertaining to the optical imaging lens according to the sixth through the tenth embodiments of the invention.

DESCRIPTION OF THE EMBODIMENTS

Figure 38:
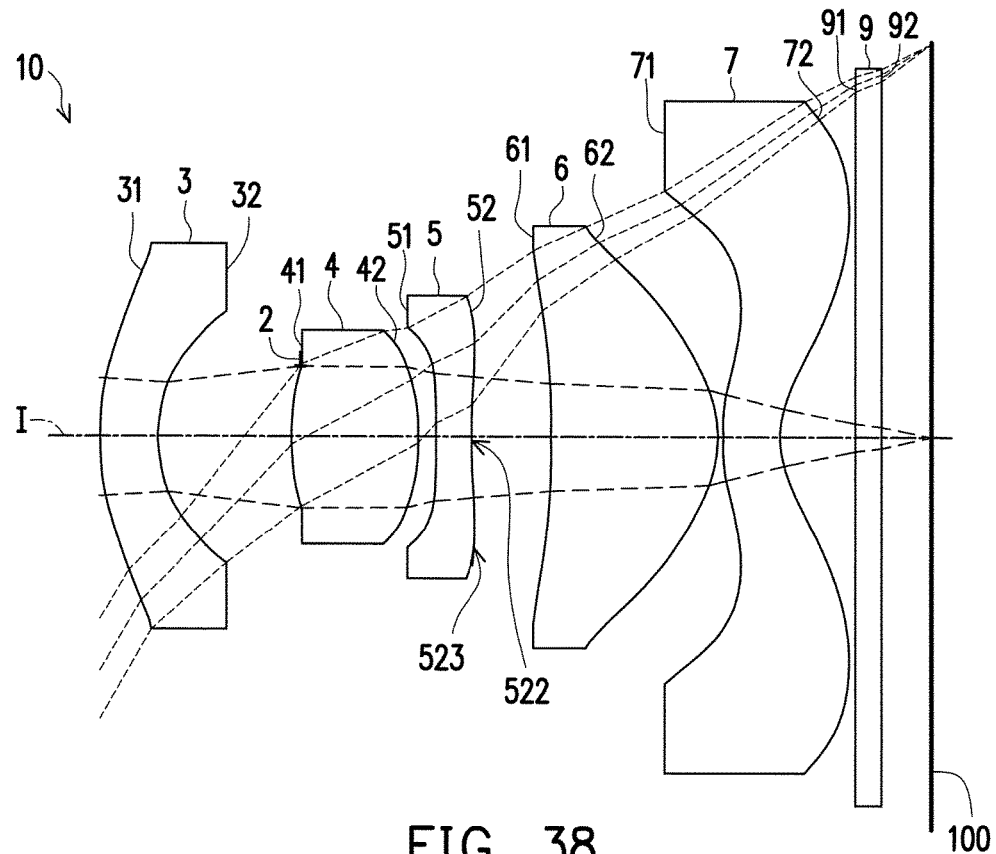
FIG. 38 is a schematic view illustrating an optical imaging lens according to a ninth embodiment of the invention.

Reference will now be made in detail to the present preferred embodiments of the invention examples of which are illustrated in the accompanying drawings. Wherever possible, the same reference numbers are used in the drawings and the description to refer to the same or like parts.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under no nal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

1. FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e., the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e., the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e., the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

FIG. 6 is a schematic view illustrating an optical imaging lens according to a first embodiment of the invention. FIGS. 7A to 7D are diagrams illustrating longitudinal spherical aberration and other aberrations of the optical imaging lens according to the first embodiment of the invention. Referring to FIG. 6, an optical imaging lens 10 in the first embodiment includes a first lens element 3, an aperture stop 2, a second lens element 4, a third lens element 5, a fourth lens element 6, a fifth lens element 7, and an infrared cut filter (IR cut filter) 9 arranged in sequence from an object side to an image side along an optical axis I of the optical imaging lens 10. When a light emitted from an object to be shot enters the optical imaging lens 10 and passes through the first lens element 3, second lens element 4, third lens element 5, fourth lens element 6, fifth lens element 7 and IR cut filter 9, an image is formed on an image plane 100. The IR cut filter 9 is disposed between the fifth lens element 7 and the image plane 100. It should be added that the object side is a side facing the object to be shot, and the image side is a side facing the image plane 100.

In the present embodiment, in the optical imaging lens 10, the first lens element 3, second lens element 4, third lens element 5, fourth lens element 6, fifth lens element 7 and filter 9 each has an object-side surfaces 31, 41, 51, 61, 71, and 91 facing the object side and allowing imaging rays to pass through, and an image-side surfaces 32, 42, 52, 62, 72, and 92 facing the image side and allowing the imaging rays to pass through. In the present embodiment, the aperture stop 2 is disposed between the first lens element 3 and the second lens element 4.

The first lens element 3 has negative refractive power. A material of the first lens element 3 is plastic. The object-side surface 31 of the first lens element 3 is a convex surface and has a convex portion 311 in the vicinity of the optical axis I and a convex portion 313 in the vicinity of the periphery. The image-side surface 32 of the first lens element 3 is a concave surface and has a concave portion 322 in the vicinity of the optical axis I and a concave portion 324 in the vicinity of the periphery. In the present embodiment, the object-side surface 31 and the image-side surface 32 of the first lens element 3 are both aspheric surfaces.

The second lens element 4 has positive refractive power. A material of the second lens element 4 is plastic. The object-side surface 41 of the second lens element 4 is a convex surface and has a convex portion 411 in the vicinity of the optical axis I and a convex portion 413 in the vicinity of the periphery. The image-side surface 42 of the second lens element 4 is a convex surface and has a convex portion 421 in the vicinity of the optical axis I and a convex portion 423 in the vicinity of the periphery. In the present embodiment, the object-side surface 41 and the image-side surface 42 of the second lens element 4 are both aspheric surfaces.

The third lens element 5 has negative refractive power. A material of the third lens element 5 is plastic. The object-side surface 51 of the third lens element 5 has a convex portion 511 in the vicinity of the optical axis I and a concave portion 514 in the vicinity of the periphery. The image-side surface 52 of the third lens element 5 is a concave surface and has a concave portion 522 in the vicinity of the optical axis I and a concave portion 524 in the vicinity of the periphery. In the present embodiment, the object-side surface 51 and the image-side surface 52 of the third lens element 5 are both aspheric surfaces.

The fourth lens element 6 has positive refractive power. A material of the fourth lens element 6 is glass. The fourth lens element 6 has a temperature coefficient of refractive index dn/dt of $-7.500 \times 10^{-6}/°$ C. and has an absolute value of the temperature coefficient of refractive index |dn/dt| of $7.500 \times 10^{-6}/°$ C. Herein, the temperature coefficient of refractive index is measured with a light having wavelength 587.6 microns (or called as the d-line) and is measured under a temperature range between 20 degrees and 40 degrees, and the temperature coefficient of refractive index refers to a change in the refractive index caused by unit temperatures, i.e., a change value of the refractive index when the temperature increase by 1° C. The object-side surface 61 of the fourth lens element 6 is a concave surface and has a concave portion 612 in the vicinity of the optical axis I and a concave portion 614 in the vicinity of the periphery. The image-side surface 62 of the fourth lens element 6 is a convex surface and has a convex portion 621 in the vicinity of the optical axis I and a convex portion 623 in the vicinity of the periphery. In the present embodiment, the object-side surface 61 and the image-side surface 62 of the fourth lens element 6 are both aspheric surfaces.

The fifth lens element 7 has negative refractive power. A material of the fifth lens element 7 is plastic. The object-side surface 71 of the fifth lens element 7 has a convex portion 711 in the vicinity of the optical axis I and a concave portion 714 in the vicinity of the periphery. The image-side surface 72 of the fifth lens element 7 has a concave portion 722 in the vicinity of the optical axis I and a convex portion 723 in the vicinity of the periphery. In the present embodiment, the object-side surface 71 and the image-side surface 72 of the fifth lens element 7 are both aspheric surfaces.

In the present embodiment, among the lens elements of the optical imaging lens 10, only the aforementioned five have refractive power.

The detailed optical data in the first embodiment is described in FIG. 8. In the first embodiment, an effective focal length (EFL) of the optical imaging lens 10 is 1.924 mm, the half field of view (HFOV) thereof is 60.03°, the f-number (Fno) thereof is 2.4, the system length thereof is 5.501 mm, and the image height thereof is 2.525 mm. Herein, the system length refers to a distance from the object-side surface 31 of the first lens element 3 to the image plane 100 along the optical axis I.

In addition, in the present embodiment, a total of ten surfaces, namely the object-side surfaces 31, 41, 51, 61, and 71 and image-side surfaces 32, 42, 52, 62, and 72 of the first lens element 3, second lens element 4, third lens element 5, fourth lens element 6, and fifth lens element 7 are aspheric surfaces. Herein, the object-side surfaces 31, 41, 51, 61, and 81 and the image-side surfaces 32, 42, 52, 62, and 82 are general even asphere surfaces. In the rest of the embodiments, the object-side surfaces or image-side surfaces of some of the lens elements are extended asphere surfaces. The asphere surfaces are defined by the following formula:

$$Z(Y) = \frac{Y^2}{R}\left(1 + \sqrt{1-(1+K)\frac{Y^2}{R^2}}\right) + \sum_{i=1}^{n} a_{2i} \times \left(\frac{Y}{R_N}\right)^{2i} \quad (1)$$

wherein:
Y: a distance from a point on an aspheric curve to the optical axis I;
Z: a depth of the asphere surface (i.e., a perpendicular distance between the point on the asphere surface that is spaced by the distance Y from the optical axis I and a tangent plane tangent to a vertex of the asphere surface on the optical axis I);
R: a radius of curvature of the surface of the lens element near the optical axis I;
K: a conic constant;
$a_{2i}$: 2ith aspheric coefficient; and
$R_N$: a normalization radius, when $R_N=1$, an aspheric coefficient defined by the formula (1) is a general even asphere surface, and when $R_N \neq 1$, the aspheric coefficient defined by the formula (1) is an extended asphere surface.

FIG. 9 shows the aspheric coefficients of the object-side surface 31 of the first lens element 3 through the image-side surface 72 of the fifth lens element 7 in the formula (1). Herein, the field number 31 in FIG. 9 represents the aspheric coefficient of the object-side surface 31 of the first lens element 3, and the rest may be deduced by analogy.

In addition, the relation among the important parameters of the optical imaging lens 10 in the first embodiment is as shown in FIG. 46 and FIG. 47.
wherein,
EFL represents an effective focal length of the optical imaging lens 10;
HFOV represents a half field of view of the optical imaging lens 10;
Fno represents a f-number of the optical imaging lens 10;
T1 represents a central thickness of the first lens element 3 along the optical axis I;
T2 represents a central thickness of the second lens element 4 along the optical axis I;
T3 represents a central thickness of the third lens element 5 along the optical axis I;
T4 represents a central thickness of the fourth lens element 6 along the optical axis I;
T5 represents a central thickness of the fifth lens element 7 along the optical axis I;
G12 represents a distance from the image-side surface 32 of the first lens element 3 to the object-side surface 41 of the second lens element 4 along the optical axis I, i.e., an air gap between the first lens element 3 and the second lens element 4 along the optical axis I;
G23 represents a distance from the image-side surface 42 of the second lens element 4 to the object-side surface 51 of the third lens element 5 along the optical axis I, i.e., an air gap between the second lens element 4 and the third lens element 5 along the optical axis I;
G34 represents a distance from the image-side surface 52 of the third lens element 5 to the object-side surface 61 of the fourth lens element 6 along the optical axis I, i.e., an air gap between the third lens element 5 and the fourth lens element 6 along the optical axis I;
G45 represents a distance from the image-side surface 62 of the fourth lens element 6 to the object-side surface 71 of the fifth lens element 7 along the optical axis I, i.e., an air gap between the fourth lens element 6 and the fifth lens element 7 along the optical axis I;
G5F represents a distance from the image-side surface 72 of the fifth lens element 7 to the object-side surface 91 of the filter 9 along the optical axis I, i.e., an air gap between the fifth lens element 7 and the filter 9 along the optical axis I;
TF represents a thickness of the filter 9 along the optical axis I;
GFP represents a distance from the image-side surface 92 of the filter 9 to the image plane 100 along the optical axis I, i.e., an air gap between the filter 9 and the image plane 100 along the optical axis I;
TTL represents a distance from the object-side surface 31 of the first lens element 3 to the image plane 100 along the optical axis I;
BFL represents a distance from the image-side surface 72 of the fifth lens element 7 to the image plane 100 along the optical axis I;
AAG represents a sum of four air gaps among the first lens element 3 to the fifth lens element 7 along the optical axis I, i.e., the sum of G12, G23, G34 and G45;
ALT represents a sum of the central thickness of the first lens element 3, second lens element 4, third lens element 5, fourth lens element 6 and fifth lens element 7 along the optical axis I, i.e., the sum of T1, T2, T3, T4 and T5;
TL represents a distance from the object-side surface 31 of the first lens element 3 to the image-side surface 72 of the fifth lens element 7 along the optical axis I;
$T_{max}$ represents the maximum value among the central thicknesses of the first lens element 3, the second lens element 4, the third lens element 5, the fourth lens element 6 and the fifth lens element 7 along the optical axis I;
$T_{min}$ represents the minimum value among the central thicknesses of the first lens element 3, the second lens element 4, the third lens element 5, the fourth lens element 6 and the fifth lens element 7 along the optical axis I.
In addition, it is defined that:
f1 is a focal length of the first lens element 3;
f2 is a focal length of the second lens element 4;
f3 is a focal length of the third lens element 5;
f4 is a focal length of the fourth lens element 6;
f5 is a focal length of the fifth lens element 7;
n1 is a refractive index of the first lens element 3;
n2 is a refractive index of the second lens element 4;
n3 is a refractive index of the third lens element 5;
n4 is a refractive index of the fourth lens element 6;
n5 is a refractive index of the fifth lens element 7;
ν1 is an Abbe number of the first lens element 3, the Abbe number may also be referred as dispersion coefficient;
ν2 is an Abbe number of the second lens element 4;
ν3 is an Abbe number of the third lens element 5;

v4 is an Abbe number of the fourth lens element 6; and
v5 is an Abbe number of the fifth lens element 7.

The optical imaging lens 10 of the first embodiment is optically designed to have favorable thermal stability. A room temperature of 20° C. is set as a benchmark, and a focal shift under this temperature is 0 mm while a focal shift under a temperature of 0° C. is −0.00161 mm. When the temperature increases to 70° C., the focal shift is −0.0001 mm.

Further referring to FIGS. 7A to 7D, FIG. 7A illustrates the longitudinal spherical aberration of the first embodiment when a pupil radius is 0.4008 mm. FIGS. 7B to 7C are diagrams respectively illustrating field curvature aberration regarding sagittal direction on the image plane 100 and field curvature aberration regarding the tangential direction on the image plane 100 in the first embodiment at wavelengths of 470 nm, 555 nm, and 650 nm. FIG. 7D is a diagram illustrating distortion aberration on the image plane 100 in the first embodiment at wavelengths of 470 nm, 555 nm, and 650 nm. In FIG. 7A that illustrates the longitudinal spherical aberration in the first embodiment, the curve of each of the wavelengths is close to one another and near the middle position, which shows that the off-axis ray of each wavelength at different heights are focused near the imaging point. The deviation range of the curve of each wavelength shows that the deviations of imaging point of the off-axis ray at different heights is controlled within a range of ±8 mm. Accordingly, it is evident that the embodiment can significantly improve the spherical aberration at the same wavelength. In addition, the curves of the three representative wavelengths are close to one another, which represents that the imaging positions of the rays with different wavelengths are concentrated; therefore, the chromatic aberration can be significantly improved.

In FIGS. 7B and 7C which illustrate two diagrams of field curvature aberration, the focal length variation of the three representative wavelengths in the entire field of view falls within ±30 mm, which represents that the optical system in the first embodiment can effectively eliminate aberration. In FIG. 7D, the diagram of distortion aberration shows that the distortion aberration in the first embodiment can be maintained within ±25%, which shows that the distortion aberration in the first embodiment can meet the image quality requirement of the optical system. Based on the above, it is shown that the first embodiment can provide better image quality compared with existing optical lens under the condition where the system length of the optical lens is shortened to about 5.501 mm. Therefore, the first embodiment can have shorter lens length and have good thermal stability performance while maintaining good optical properties.

FIG. 10 is a schematic view illustrating an optical imaging lens according to a second embodiment of the invention. FIGS. 11A to 11D are diagrams illustrating longitudinal spherical aberration and other aberrations of the optical imaging lens according to the second embodiment of the invention. Referring to FIG. 10, the second embodiment of the optical imaging lens 10 of the invention is similar to the first embodiment; the difference therebetween is as follows: optical data, aspheric coefficients and the parameters of the lens elements 3, 4, 5, 6, and 7. Besides, in the present embodiment, the second lens element 4 is made of glass. The fourth lens element 6 is made of plastic. In addition, the object-side surface 51 of the third lens element 5 is a concave surface and has a concave portion 512 in the vicinity of the optical axis I and a concave portion 514 in the vicinity of the periphery. The image-side surface 52 of the third lens element 5 has a concave portion 522 in the vicinity of the optical axis I and a convex portion 523 in the vicinity of the periphery. The object-side surface 61 of the fourth lens element 6 has a convex portion 611 in the vicinity of the optical axis I and a concave portion 614 in the vicinity of the periphery. It should be noted that, in order to show the view clearly, some numerals which are the same as those used for the concave portion and convex portion in the first embodiment are omitted from FIG. 10. In addition, in the present embodiment, the object-side surface 41 and the image-side surface 42 of the second lens element 4 are both spherical surfaces.

The optical imaging lens 10 of the second embodiment is optically designed to have favorable thermal stability. A room temperature of 20° C. is set as a benchmark, and a focal shift under this temperature is 0 mm while a focal shift under a temperature of 0° C. is 0.00696 mm. When the temperature increases to 70° C., the focal shift is −0.0189 mm.

The second lens element 4 of the second embodiment is a glass lens and has a temperature coefficient of refractive index dn/dt of $0.900 \times 10^{-6}/°$ C. and an absolute value of the temperature coefficient of refractive index $|dn/dt|$ of $0.900 \times 10^{-6}/°$ C.

The detailed optical data pertaining to the optical imaging lens 10 of the second embodiment is as shown in FIG. 12. An effective focal length of the optical imaging lens 10 of the second embodiment is 2.132 mm, the HFOV thereof is 60.16°, the Fno thereof is 2.4, the system length thereof is 5.498 mm, and the image height thereof is 2.525 mm.

FIG. 13 shows the aspheric coefficients of the object-side surface 31 of the first lens element 3 through the image-side surface 72 of the fifth lens element 7 in the second embodiment in the formula (1).

In addition, the relation among the important parameters of the optical imaging lens 10 in the second embodiment is as shown in FIG. 46 and FIG. 47.

In FIG. 11A that illustrates the longitudinal spherical aberration in the second embodiment with the pupil radius of 0.4442 mm, the imaging point deviation of the off-axis ray at different heights is controlled within ±12 mm. In FIGS. 11B and 11C which illustrate two diagrams of field curvature aberration, the focal length variation of the three representative wavelengths in the entire field of view falls within ±40 mm. In FIG. 11D, the diagram of distortion aberration shows that the distortion aberration in the second embodiment can be maintained within ±25%.

Based on the above, it can be obtained that the system length of the second embodiment is shorter than that of the first embodiment. The HFOV of the second embodiment is larger than the HFOV of the first embodiment. The second embodiment can be manufactured more easily than the first embodiment; therefore, a higher yield rate can be achieved.

FIG. 14 is a schematic view illustrating an optical imaging lens according to a third embodiment of the invention. FIGS. 15A to 15D are diagrams illustrating longitudinal spherical aberration and other aberrations of the optical imaging lens according to the third embodiment of the invention. Referring to FIG. 14, the third embodiment of the optical imaging lens 10 of the invention is similar to the first embodiment; the difference therebetween is as follows: optical data, aspheric coefficients and the parameters of the lens elements 3, 4, 5, 6, and 7. It should be noted that, in order to show the view clearly, some numerals which are the same as those used for the concave portion and convex portion in the first embodiment are omitted from FIG. 14. In addition, in the present embodiment, the object-side surface 31 and the image-side surface 32 of the first lens element 3 are both general even asphere surfaces. The object-side surface 41 and the image-side surface 42 of the second lens element 4 are both general even asphere surfaces. The object-side surface 51 and image-side surface 52 of the third lens element 5 are both extended asphere surfaces. The object-side surface 61 and image-side surface 62 of the fourth lens element 6 are both sphere surfaces. The object-side surface 71 and image-side surface 72 of the fifth lens element 7 are both extended asphere surfaces.

The optical imaging lens 10 of the third embodiment is optically designed to have favorable thermal stability. A room temperature of 20° C. is set as a benchmark, and a focal shift under this temperature is 0 mm while a focal shift under a temperature of 0° C. is −0.0045 mm. When the temperature increases to 70° C., the focal shift is 0.0005 mm.

The fourth lens element 6 of the third embodiment is a glass lens and has a temperature coefficient of refractive index dn/dt of $4.070 \times 10^{-6}/°$ C. and an absolute value of the temperature coefficient of refractive index |dn/dt| of $4.070 \times 10^{-6}/°$ C.

The detailed optical data pertaining to the optical imaging lens 10 of the third embodiment is as shown in FIG. 16. An effective focal length of the optical imaging lens 10 of the third embodiment is 1.934 mm, the HFOV thereof is 59.955°, the Fno thereof is 2.4, the system length thereof is 5.704 mm, and the image height thereof is 2.525 mm.

FIG. 17 shows the aspheric coefficients of the object-side surface 31 of the first lens element 3 through the image-side surface 72 of the fifth lens element 7 in the third embodiment in the formula (1).

In addition, the relation among the important parameters of the optical imaging lens 10 in the third embodiment is as shown in FIG. 46 and FIG. 47.

In FIG. 15A that illustrates the longitudinal spherical aberration in the third embodiment with the pupil radius of 0.3919 mm, the imaging point deviation of the off-axis ray at different heights is controlled within ±25 mm. In FIGS. 15B and 15C which illustrate two diagrams of field curvature aberration, the focal length variation of the three representative wavelengths in the entire field of view falls within ±65 mm. In FIG. 15D, the diagram of distortion aberration shows that the distortion aberration in the third embodiment can be maintained within ±25%.

Based on the above, it can be obtained that the third embodiment can be manufactured more easily than the first embodiment; therefore, a higher yield rate can be achieved.

FIG. 18 is a schematic view illustrating an optical imaging lens according to a fourth embodiment of the invention. FIGS. 19A to 19D are diagrams illustrating longitudinal spherical aberration and other aberrations of the optical imaging lens according to the fourth embodiment of the invention. Referring to FIG. 18, the fourth embodiment of the optical imaging lens 10 of the invention is similar to the first embodiment; the difference therebetween is as follows: optical data, aspheric coefficients and the parameters of the lens elements 3, 4, 5, 6, and 7. In addition, the image-side surface 52 of the third lens element 5 has a concave portion 522 in the vicinity of the optical axis I and a convex portion 523 in the vicinity of the periphery. It should be noted that, in order to show the view clearly, some numerals which are the same as those used for the concave portion and convex portion in the first embodiment are omitted from FIG. 18.

The optical imaging lens 10 of the fourth embodiment is optically designed to have favorable thermal stability. A room temperature of 20° C. is set as a benchmark, and a focal shift under this temperature is 0 mm while a focal shift under a temperature of 0° C. is −0.00023 mm. When the temperature increases to 70° C., the focal shift is −0.00279 mm.

The fourth lens element 6 of the fourth embodiment is a glass lens and has a temperature coefficient of refractive index dn/dt of $-7.500 \times 10^{-6}/°$ C. and an absolute value of the temperature coefficient of refractive index |dn/dt| of $7.500 \times 10^{-6}/°$ C.

The detailed optical data pertaining to the optical imaging lens 10 of the fourth embodiment is as shown in FIG. 20. An effective focal length of the optical imaging lens 10 of the fourth embodiment is 1.758 mm, the HFOV thereof is 60.05°, the Fno thereof is 2.42, the system length thereof is 4.814 mm, and the image height thereof is 2.525 mm.

FIG. 21 shows the aspheric coefficients of the object-side surface 31 of the first lens element 3 through the image-side surface 72 of the fifth lens element 7 in the fourth embodiment in the formula (1).

In addition, the relation among the important parameters of the optical imaging lens 10 in the fourth embodiment is as shown in FIG. 46 and FIG. 47.

In FIG. 19A that illustrates the longitudinal spherical aberration in the fourth embodiment with the pupil radius of 0.3662 mm, the imaging point deviation of the off-axis ray at different heights is controlled within ±7 mm. In FIGS. 19B and 19C which illustrate two diagrams of field curvature aberration, the focal length variation of the three representative wavelengths in the entire field of view falls within ±20 mm. In FIG. 19D, the diagram of distortion aberration shows that the distortion aberration in the fourth embodiment can be maintained within ±18%.

Based on the above, it can be obtained that the system length of the fourth embodiment is shorter than that of the first embodiment. The HFOV of the fourth embodiment is larger than the HFOV of the first embodiment. The longitudinal spherical aberration of the fourth embodiment is less than the longitudinal spherical aberration of the first embodiment. The field curvature of the fourth embodiment is less than the field curvature of the first embodiment. The distortion of the fourth embodiment is less than the distortion of the first embodiment. The thermal stability of the fourth embodiment under a low temperature is greater than the thermal stability of the first embodiment under the low temperature.

FIG. 22 is a schematic view illustrating an optical imaging lens according to a fifth embodiment of the invention. FIGS. 23A to 23D are diagrams illustrating longitudinal spherical aberration and other aberrations of the optical imaging lens according to the fifth embodiment of the invention. Referring to FIG. 22, the fifth embodiment of the optical imaging lens 10 of the invention is similar to the first embodiment; the difference therebetween is as follows: optical data, aspheric coefficients and the parameters of the lens elements 3, 4, 5, 6, and 7. It should be noted that, in order to show the view clearly, some numerals which are the same as those used for the concave portion and convex portion in the first embodiment are omitted from FIG. 22.

The optical imaging lens 10 of the fifth embodiment is optically designed to have favorable thermal stability. A room temperature of 20° C. is set as a benchmark, and a focal shift under this temperature is 0 mm while a focal shift under a temperature of 0° C. is 0.00045 mm. When the temperature increases to 70° C., the focal shift is −0.00612 mm.

The fourth lens element 6 of the fifth embodiment is a glass lens and has a temperature coefficient of refractive index dn/dt of $-7.500\times10^{-6}/°$ C. and an absolute value of the temperature coefficient of refractive index |dn/dt| of $7.500\times10^{-6}/°$ C.

The detailed optical data pertaining to the optical imaging lens 10 of the fifth embodiment is as shown in FIG. 24. An effective focal length of the optical imaging lens 10 of the fifth embodiment is 1.980 mm, the HFOV thereof is 60.02°, the Fno thereof is 2.44, the system length thereof is 5.090 mm, and the image height thereof is 2.525 mm.

FIG. 25 shows the aspheric coefficients of the object-side surface 31 of the first lens element 3 through the image-side surface 72 of the fifth lens element 7 of the fifth embodiment in the formula (1).

In addition, the relation among the important parameters of the optical imaging lens 10 in the fifth embodiment is as shown in FIG. 46 and FIG. 47.

In FIG. 23A that illustrates the longitudinal spherical aberration in the fifth embodiment with the pupil radius of 0.4125 mm, the imaging point deviation of the off-axis ray at different heights is controlled within ±14 mm. In FIGS. 23B and 23C which illustrate two diagrams of field curvature aberration, the focal length variation of the three representative wavelengths in the entire field of view falls within ±50 mm. In FIG. 23D, the diagram of distortion aberration shows that the distortion aberration in the fifth embodiment can be maintained within ±28%.

Based on the above, it can be obtained that the system length of the fifth embodiment is shorter than that of the first embodiment. The thermal stability of the fifth embodiment under a low temperature is greater than the thermal stability of the first embodiment under the low temperature.

FIG. 26 is a schematic view illustrating an optical imaging lens according to a sixth embodiment of the invention. FIGS. 27A to 27D are diagrams illustrating longitudinal spherical aberration and other aberrations of the optical imaging lens according to the sixth embodiment of the invention. Referring to FIG. 26, the sixth embodiment of the optical imaging lens 10 of the invention is similar to the first embodiment; the difference therebetween is as follows: optical data, aspheric coefficients and the parameters of the lens elements 3, 4, 5, 6, and 7. The image-side surface 52 of the third lens element 5 has a concave portion 522 in the vicinity of the optical axis I and a convex portion 523 in the vicinity of the periphery. The object-side surface 61 of the fourth lens element 6 has a concave portion 612 in the vicinity of the optical axis I and a convex portion 613 in the vicinity of the periphery. It should be noted that, in order to show the view clearly, some numerals which are the same as those used for the concave portion and convex portion in the first embodiment are omitted from FIG. 26.

The optical imaging lens 10 of the sixth embodiment is optically designed to have favorable thermal stability. A room temperature of 20° C. is set as a benchmark, and a focal shift under this temperature is 0 mm while a focal shift under a temperature of 0° C. is 0.00037 mm. When the temperature increases to 70° C., the focal shift is −0.00409 mm.

The fourth lens element 6 of the sixth embodiment is a glass lens and has a temperature coefficient of refractive index dn/dt of $-7.500\times10^{-6}/°$ C. and an absolute value of the temperature coefficient of refractive index |dn/dt| of $7.500\times10^{-6}/°$ C.

The detailed optical data pertaining to the optical imaging lens 10 of the sixth embodiment is as shown in FIG. 28. An effective focal length of the optical imaging lens 10 of the sixth embodiment is 1.675 mm, the HFOV thereof is 60.02°, the Fno thereof is 2.42, the system length thereof is 5.026 mm, and the image height thereof is 2.525 mm.

FIG. 29 shows the aspheric coefficients of the object-side surface 31 of the first lens element 3 through the image-side surface 72 of the fifth lens element 7 of the sixth embodiment in the formula (1).

In addition, the relation among the important parameters of the optical imaging lens 10 in the sixth embodiment is as shown in FIG. 48 and FIG. 49.

In FIG. 27A that illustrates the longitudinal spherical aberration in the sixth embodiment with the pupil radius of 0.3489 mm, the imaging point deviation of the off-axis ray at different heights is controlled within ±12 mm. In FIGS. 27B and 27C which illustrate two diagrams of field curvature aberration, the focal length variation of the three representative wavelengths in the entire field of view falls within ±60 mm. In FIG. 27D, the diagram of distortion aberration shows that the distortion aberration in the sixth embodiment can be maintained within ±14%.

Based on the above, it can be obtained that the system length of the sixth embodiment is shorter than that of the first embodiment. The field curvature of the sixth embodiment is less than the field curvature of the first embodiment. The distortion of the sixth embodiment is less than the distortion of the first embodiment. The thermal stability of the sixth embodiment under a low temperature is greater than the thermal stability of the first embodiment under the low temperature. The sixth embodiment can be manufactured more easily than the first embodiment; therefore, a higher yield rate can be achieved.

FIG. 30 is a schematic view illustrating an optical imaging lens according to a seventh embodiment of the invention. FIGS. 31A to 32D are diagrams illustrating longitudinal spherical aberration and other aberrations of the optical imaging lens according to the seventh embodiment of the invention. Referring to FIG. 30, the seventh embodiment of the optical imaging lens 10 of the invention is similar to the first embodiment; the difference therebetween is as follows: optical data, aspheric coefficients and the parameters of the lens elements 3, 4, 5, 6, and 7. It should be noted that, in order to show the view clearly, some numerals which are the same as those used for the concave portion and convex portion in the first embodiment are omitted from FIG. 30.

The optical imaging lens 10 of the seventh embodiment is optically designed to have favorable thermal stability. A room temperature of 20° C. is set as a benchmark, and a focal shift under this temperature is 0 mm while a focal shift under a temperature of 0° C. is −0.0022 mm. When the temperature increases to 70° C., the focal shift is 0.00119 mm.

The fourth lens element 6 of the seventh embodiment is a glass lens and has a temperature coefficient of refractive index dn/dt of $-7.500\times10^{-6}/°$ C. and an absolute value of the temperature coefficient of refractive index |dn/dt| of $7.500\times10^{-6}/°$ C.

The detailed optical data pertaining to the optical imaging lens 10 of the seventh embodiment is as shown in FIG. 32. An effective focal length of the optical imaging lens 10 of the seventh embodiment is 1.815 mm, the HFOV thereof is 60.023°, the Fno thereof is 2.44, the system length thereof is 5.170 mm, and the image height thereof is 2.525 mm.

FIG. 33 shows the aspheric coefficients of the object-side surface 31 of the first lens element 3 through the image-side surface 72 of the fifth lens element 7 of the seventh embodiment in the formula (1).

In addition, the relation among the important parameters of the optical imaging lens 10 in the seventh embodiment is as shown in FIG. 48 and FIG. 49.

In FIG. 31A that illustrates the longitudinal spherical aberration in the seventh embodiment with the pupil radius of 0.3782 mm, the imaging point deviation of the off-axis ray at different heights is controlled within ±6 mm. In FIGS. 31B and 31C which illustrate two diagrams of field curvature aberration, the focal length variation of the three representative wavelengths in the entire field of view falls within ±35 mm. In FIG. 31D, the diagram of distortion aberration shows that the distortion aberration in the seventh embodiment can be maintained within ±20%.

Based on the above, it can be obtained that the system length of the seventh embodiment is shorter than that of the first embodiment. The longitudinal spherical aberration of the seventh embodiment is less than the longitudinal spherical aberration of the first embodiment. The distortion of the seventh embodiment is less than the distortion of the first embodiment. The thermal stability of the seventh embodiment under a low temperature is greater than the thermal stability of the first embodiment under the low temperature.

FIG. 34 is a schematic view illustrating an optical imaging lens according to an eighth embodiment of the invention. FIGS. 35A to 35D are diagrams illustrating longitudinal spherical aberration and other aberrations of the optical imaging lens according to the eighth embodiment of the invention. Referring to FIG. 30, the eighth embodiment of the optical imaging lens 10 of the invention is similar to the first embodiment; the difference therebetween is as follows: optical data, aspheric coefficients and the parameters of the lens elements 3, 4, 5, 6, and 7. It should be noted that, in order to show the view clearly, some numerals which are the same as those used for the concave portion and convex portion in the first embodiment are omitted from FIG. 34.

The optical imaging lens 10 of the eighth embodiment is optically designed to have favorable thermal stability. A room temperature of 20° C. is set as a benchmark, and a focal shift under this temperature is 0 mm while a focal shift under a temperature of 0° C. is −0.00221 mm. When the temperature increases to 70° C., the focal shift is 0.00119 mm.

The fourth lens element 6 of the eighth embodiment is a glass lens and has a temperature coefficient of refractive index dn/dt of −7.500×10$^{-6}$/° C. and an absolute value of the temperature coefficient of refractive index |dn/dt| of 7.500× 10$^{-6}$/° C.

The detailed optical data pertaining to the optical imaging lens 10 of the eighth embodiment is as shown in FIG. 36. An effective focal length of the optical imaging lens 10 of the eighth embodiment is 1.839 mm, the HFOV thereof is 60.500°, the Fno thereof is 2.44, the system length thereof is 5.170 mm, and the image height thereof is 2.525 mm.

FIG. 37 shows the aspheric coefficients of the object-side surface 31 of the first lens element 3 through the image-side surface 72 of the fifth lens element 7 of the eighth embodiment in the formula (1).

In addition, the relation among the important parameters of the optical imaging lens 10 in the eighth embodiment is as shown in FIG. 48 and FIG. 49.

In FIG. 35A that illustrates the longitudinal spherical aberration in the eighth embodiment with the pupil radius of 0.3782 mm, the imaging point deviation of the off-axis ray at different heights is controlled within ±6 mm. In FIGS. 35B and 35C which illustrate two diagrams of field curvature aberration, the focal length variation of the three representative wavelengths in the entire field of view falls within ±35 mm. In FIG. 35D, the diagram of distortion aberration shows that the distortion aberration in the eighth embodiment can be maintained within ±20%.

Based on the above, it can be obtained that the system length of the eighth embodiment is shorter than that of the first embodiment. The longitudinal spherical aberration of the eighth embodiment is less than the longitudinal spherical aberration of the first embodiment. The distortion of the eighth embodiment is less than the distortion of the first embodiment. The thermal stability of the eighth embodiment under a low temperature is greater than the thermal stability of the first embodiment under the low temperature. The eighth embodiment can be manufactured more easily than the first embodiment; therefore, a higher yield rate can be achieved.

FIG. 38 is a schematic view illustrating an optical imaging lens according to a ninth embodiment of the invention. FIGS. 39A to 39D are diagrams illustrating longitudinal spherical aberration and other aberrations of the optical imaging lens according to the ninth embodiment of the invention. Referring to FIG. 38, the ninth embodiment of the optical imaging lens 10 of the invention is similar to the first embodiment; the difference therebetween is as follows: optical data, aspheric coefficients and the parameters of the lens elements 3, 4, 5, 6, and 7. The image-side surface 52 of the third lens element 5 has a concave portion 522 in the vicinity of the optical axis I and a convex portion 523 in the vicinity of the periphery. It should be noted that, in order to show the view clearly, some numerals which are the same as those used for the concave portion and convex portion in the first embodiment are omitted from FIG. 38.

The optical imaging lens 10 of the ninth embodiment is optically designed to have favorable thermal stability. A room temperature of 20° C. is set as a benchmark, and a focal shift under this temperature is 0 mm while a focal shift under a temperature of 0° C. is −0.00103 mm. When the temperature increases to 70° C., the focal shift is −0.0012 mm.

The fourth lens element 6 of the ninth embodiment is a glass lens and has a temperature coefficient of refractive index dn/dt of −7.500×10$^{-6}$/° C. and an absolute value of the temperature coefficient of refractive index |dn/dt| of 7.500× 10$^{-6}$/° C.

The detailed optical data pertaining to the optical imaging lens 10 of the ninth embodiment is as shown in FIG. 40. An effective focal length of the optical imaging lens 10 of the ninth embodiment is 1.821 mm, the HFOV thereof is 59.98°, the Fno thereof is 2.44, the system length thereof is 5.295 mm, and the image height thereof is 2.525 mm.

FIG. 41 shows the aspheric coefficients of the object-side surface 31 of the first lens element 3 through the image-side surface 72 of the fifth lens element 7 of the ninth embodiment in the formula (1).

In addition, the relation among the important parameters of the optical imaging lens 10 in the ninth embodiment is as shown in FIG. 48 and FIG. 49.

Figures 39A, 39B, 39C, 39D:
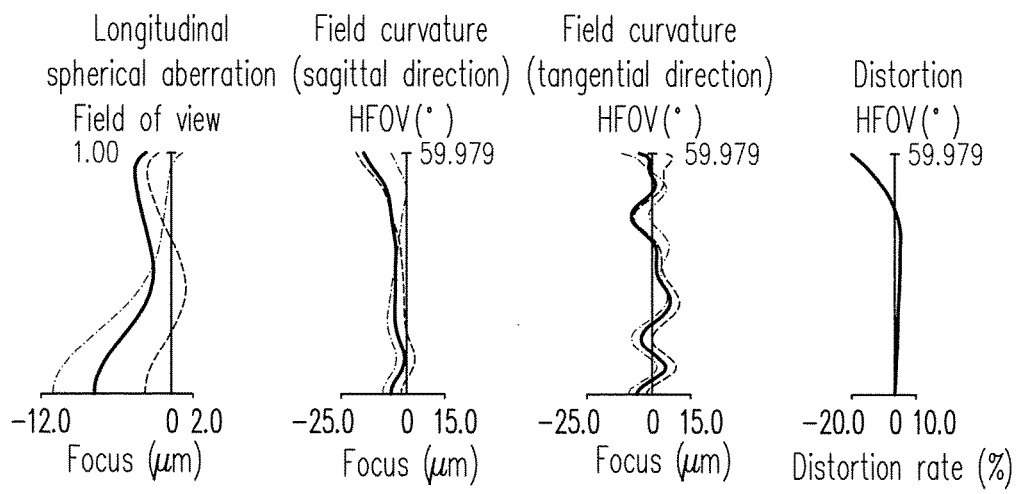
FIGS. 39A to 39D are diagrams illustrating longitudinal spherical aberration and other aberrations of the optical imaging lens according to the ninth embodiment of the invention.

In FIG. 39A that illustrates the longitudinal spherical aberration in the ninth embodiment with the pupil radius of 0.3793 mm, the imaging point deviation of the off-axis ray at different heights is controlled within ±12 mm. In FIGS. 39B and 39C which illustrate two diagrams of field curvature aberration, the focal length variation of the three representative wavelengths in the entire field of view falls within ±25 mm. In FIG. 39D, the diagram of distortion aberration shows that the distortion aberration in the ninth embodiment can be maintained within ±20%.

Based on the above, it can be obtained that the system length of the ninth embodiment is shorter than that of the first embodiment. The field curvature of the ninth embodiment is less than the field curvature of the first embodiment. The distortion of the ninth embodiment is less than the distortion of the first embodiment. The thermal stability of the ninth embodiment under a low temperature is greater than the thermal stability of the first embodiment under the low temperature.

FIG. 42 is a schematic view illustrating an optical imaging lens according to a tenth embodiment of the invention. FIGS. 43A to 43D are diagrams illustrating longitudinal spherical aberration and other aberrations of the optical imaging lens according to the tenth embodiment of the invention. Referring to FIG. 42, the tenth embodiment of the optical imaging lens 10 of the invention is similar to the first embodiment; the difference therebetween is as follows: optical data, aspheric coefficients and the parameters of the lens elements 3, 4, 5, 6, and 7. It should be noted that, in order to show the view clearly, some numerals which are the same as those used for the concave portion and convex portion in the first embodiment are omitted from FIG. 42.

The optical imaging lens 10 of the tenth embodiment is optically designed to have favorable thermal stability. A room temperature of 20° C. is set as a benchmark, and a focal shift under this temperature is 0 mm while a focal shift under a temperature of 0° C. is −0.00112 mm. When the temperature increases to 70° C., the focal shift is −0.00127 mm.

The fourth lens element 6 of the tenth embodiment is a glass lens and has a temperature coefficient of refractive index dn/dt of $-7.500 \times 10^{-6}$/° C. and an absolute value of the temperature coefficient of refractive index $|dn/dt|$ of $7.500 \times 10^{-6}$/° C.

The detailed optical data pertaining to the optical imaging lens 10 of the tenth embodiment is as shown in FIG. 44. An effective focal length of the optical imaging lens 10 of the tenth embodiment is 1.872 mm, the HFOV thereof is 60.04°, the Fno thereof is 2.43, the system length thereof is 5.109 mm, and the image height thereof is 2.525 mm.

FIG. 45 shows the aspheric coefficients of the object-side surface 31 of the first lens element 3 through the image-side surface 72 of the fifth lens element 7 of the tenth embodiment in the formula (1).

In addition, the relation among the important parameters of the optical imaging lens 10 in the tenth embodiment is as shown in FIG. 48 and FIG. 49.

In FIG. 43A that illustrates the longitudinal spherical aberration in the tenth embodiment with the pupil radius of 0.3900 mm, the imaging point deviation of the off-axis ray at different heights is controlled within ±9 mm. In FIGS. 43B and 43C which illustrate two diagrams of field curvature aberration, the focal length variation of the three representative wavelengths in the entire field of view falls within ±32 mm. In FIG. 43D, the diagram of distortion aberration shows that the distortion aberration in the tenth embodiment can be maintained within ±23%.

Based on the above, it can be obtained that the system length of the tenth embodiment is shorter than that of the first embodiment. The HFOV of the tenth embodiment is larger than the HFOV of the first embodiment. The distortion of the tenth embodiment is less than the distortion of the first embodiment. The thermal stability of the tenth embodiment under a low temperature is greater than the thermal stability of the first embodiment under the low temperature.

Further referring to FIGS. 46, 47, 48, and 49, FIGS. 46, 47, 48, and 49 show tables which list the optical parameters of the first to the tenth embodiments described above.

In order to shorten the length of the lens element system and to ensure image quality, the thickness of the lens elements and the air gaps among the lens elements in the embodiments of the invention are suitably shortened, though considering a difficulty level of a manufacturing process, so under the circumstance that the value limitations in the following conditional expressions are satisfied, better configuration may be achieved.

$8.200 \leq (T2+T4)/T_{min}$, preferably in the range of $8.200 \leq (T2+T4)T_{min} \leq 9.800$.

$4.600 \leq ALT/(T3+T5)$, preferably in the range of $4.600 \leq ALT/(T3+T5) \leq 6.400$.

$TL/G12 \leq 7.000$, preferably in the range of $4.400 \leq TL/G12 \leq 7.000$.

$5.000 \leq TL/(G23+T3+G45+T5)$, preferably in the range of $5.000 \leq TL/(G23+T3+G45+T5) \leq 6.800$.

$6.000 \ TL/(T3+G45+T5)$, preferably in the range of $6.000 \leq TL/(T3+G45+T5) \leq 7.300$.

$3.600 \leq ALT/(G23+T3+G45+T5)$, preferably in the range of $3.600 \leq ALT/(G23+T3+G45+T5) \leq 5.500$.

$6.300 \leq TL/(T3+T5)$, preferably in the range of $6.300 \leq TL/(T3+T5) \leq 7.900$.

$6.900 \ TL/(G23+G45+T5)$, preferably in the range of $6.900 \leq TL/(G23+G45+T5) \leq 20.900$.

$ALT/(G12+G45) \leq 5.600$, preferably in the range of $2.800 \leq ALT/(G12+G45) \leq 5.600$.

$5.200 \leq ALT/(G23+G45+T5)$, preferably in the range of $5.200 \leq ALT/(G23+G45+T5) \leq 8.900$.

$4.40 \leq ALT/(T3+G45+T5)$, preferably in the range of $4.400 \leq ALT/(T3+G45+T5) \leq 6.000$.

Further, the ratio of the optical element parameters to the length of the lens is kept at a suitable value, so as to prevent the parameters becoming too small so that it not easy to be produced and manufactured, or to prevent the parameters becoming too large so that the length of the lens is too long, and the optical imaging lens 10 provided by the embodiments of the invention may satisfy the following conditional expressions:

$8.800 \leq TTL/(T3+T5)$, preferably in the range of $8.800 \leq TTL/(T3+T5) \leq 20.700$.

$6.700 \leq TTL/(G23+T3+G45+T5)$, preferably in the range of $6.700 \leq TTL/(G23+T3+G45+T5) \leq 9.200$.

$TTL/G12 \leq 9.500$, preferably in the range of $5.700 \leq TTL/G12 \leq 9.500$.

$6.800 \leq TTL/(G23+T3+T5)$, preferably in the range of $6.800 \leq TTL/(G23+T3+T5) \leq 9.900$.

$1.700 \leq TL/EFL$, preferably in the range of $1.700 \leq TL/EFL \leq 2.400$.

Alternatively, any combination of the parameters in the embodiments may additionally selected for increasing lens limitations, so as to facilitate the lens design of the same framework according to the embodiments of the invention. Due to the unpredictability in the design of an optical system, with the framework of the invention, under the circumstances where the above-described conditions are satisfied, the telephoto lens according to the embodiments of the invention with increased depth, bigger aperture availability, improved image quality, or better yield rate can be preferably achieved so as to improve the shortcoming of prior art.

The above-limited relation is provided in an exemplary sense and can be selectively combined and applied to the embodiments of the invention in different manners; the invention should not be limited to the above examples. In implementation of the invention, apart from the above-described relations, it is also possible to add additional detailed structures such as more concave and convex curvatures arrangement of a specific lens element or a plurality of lens elements so as to enhance control of system property and/or resolution. For example, it is optional to form a concave portion in the vicinity of the periphery on the object-side surface of the third lens element. It should be noted that the above-described details can be optionally combined and applied to the other embodiments of the invention under the condition where they are not in conflict with one another.

Based on the above, the optical imaging lens 10 in the embodiment of the invention can achieve the following effects and advantages.

1. The longitudinal spherical aberrations, astigmatism aberrations, and distortion aberration of each of the embodiments of the invention are all complied with usage specifications. In addition, the curves of the three representative wavelengths: red, green, and blue are all near the middle position, which shows that the off-axis ray of each wavelength at different heights are focused near the imaging point. The skew margin of the curve of each wavelength shows that the imaging point deviation of the off-axis ray at different heights is well controlled to achieve a good capability to suppress spherical aberration, astigmatism aberration and distortion aberration. Further referring to the imaging quality data, distances among the three representative wavelengths red, green and blue are fairly close, which represents that the optical imaging lens of the embodiments of the invention has a good concentration of rays with different wavelengths and under different states and has an excellent capability to suppress dispersion. Based on the above, through the design and combination of the lens elements, favorable imaging quality is thus achieved.

2. The first lens element 3 has negative refractive power and thus is conducive to enlarge the angle of the system half field view.

3. The object-side surface 31 of the first lens element 3 is designed to have the convex portion 311 in the vicinity of the optical axis I and a convex portion 313 in the vicinity of the periphery, and moreover, the object-side surface 41 of the second lens element 4 has the convex portion 413 in the vicinity of the periphery, and the image-side surface 42 of the second lens element 4 has the convex portion 421 in the vicinity of the optical axis I, such that light converging is effectively generated.

4. The image-side surface 52 of the third lens element 5 has the concave portion 522 in the vicinity of the optical axis I, the image-side surface 62 of the fourth lens element 6 has the convex portion 623 in the vicinity of the periphery, and moreover, the object-side surface 71 of the fifth lens element 7 has the concave portion 714 in the vicinity of the periphery, all of which can facilitate to correct the aberration generated.

5. In the optical imaging lens 10 provided by the embodiments of the invention, at least one piece of the lens elements with a material satisfying the condition expression of $|dn/dt| \leq 8.500 \times 10^{-6}/^\circ$ C. and at least one piece of the lens elements with a material of plastic are selected. Alternatively, when the at least one piece of the lens elements with the material satisfying the condition expression of $|dn/dt| \leq 8.500 \times 10^{-6}/^\circ$ C. is selected and the material of the first lens element 3 is plastic, thermal stability effect may also be achieved. Furthermore, in the optical imaging lens 10 provided by the embodiments of the invention, if the at least one piece of the lens elements has the material satisfying the condition expression of $|dn/dt| \leq 8.500 \times 10^{-6}/^\circ$ C. and the material is glass, better thermal stability effect is obtained. Further, when temperature rises from 0° C. to 70° C., a focal shift of the optical imaging lens 10 provided by the embodiments of the invention does not exceed 0.003 mm.

6. Herein, the material of the fourth lens element 6 satisfies the condition expression of $|dn/dt| \leq 8.500 \times 10^{-6}/^\circ$ C. and thus delivers the best thermal stability effect, and moreover, the material of the fourth lens element 6 is glass.

7. The optical imaging lens 10 provided by the embodiments of the invention satisfies $4.000 \leq (T1+G12+T4)/(G23+G45+T5)$. The length of the lens element system may be effectively shortened and the image quality may be maintained through adjusting the thickness and gap ratios among the lens elements, wherein $(T1+G12+T4)/(G23+G45+T5)$, preferably ranges from 4.000 to 6.700. Moreover, the object-side surface 31 of the first lens element 3 is designed to have the convex portion 313 in the vicinity of the periphery, and the aberration correction effect can be achieved since 3.700 $(T1+G12+T4)/(G23+G45+T5)$, wherein $(T1+G12+T4)/(G23+G45+T5)$, preferably ranges from 3.700 to 6.700.

The value range including the maximum and minimum values obtained by the combination ratio relationship of the optical parameters disclosed in the embodiments of the invention may be implemented accordingly.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical imaging lens comprising a first lens element, a second lens element, a third lens element, a fourth lens element, and a fifth lens element arranged in a sequence from an object side to an image side along an optical axis, wherein each of the first lens element to the fifth lens element comprises an object-side surface facing the object side and allowing imaging rays to pass through and an image-side surface facing the image side and allowing the imaging rays to pass through;

the first lens element comprising negative refractive power, the object-side surface of the first lens element comprising a convex portion in a vicinity of the optical axis;

the object-side surface of the second lens element comprising a convex portion in a vicinity of a periphery, the image-side surface of the second lens element comprising a convex portion in the vicinity of the optical axis;

the image-side surface of the third lens element comprising a concave portion in the vicinity of the optical axis;

the image-side surface of the fourth lens element comprising a convex portion in the vicinity of the periphery; and the object-side surface of the fifth lens element comprising a concave portion in the vicinity of the periphery;

wherein the optical imaging lens comprises at least one piece of the lens elements with a material satisfying a condition expression of $|dn/dt| \leq 8.500 \times 10^{-6}/^\circ$ C. and at least one piece of the lens elements with a material of plastic, and, among the lens elements of the optical imaging lens, only the aforementioned five lens elements have refractive power, and the optical imaging lens satisfies:

$$(T1+G12+T4)/(G23+G45+T5) \geq 4.000,$$

wherein T1 is a central thickness of the first lens element along the optical axis, T4 is a central thickness of the fourth lens element along the optical axis, T5 is a central thickness of the fifth lens element along the optical axis, G12 is an air gap between the first lens element and the second lens element along the optical axis, G23 is an air gap between the second lens element and the third lens element along the optical axis, G45 is an air gap between the fourth lens element and the fifth lens element along the optical axis, and |dn/dt| is an absolute value of a temperature coefficient of refractive index, wherein the optical imaging lens further satisfies: TTL/(G23+T3+G45+T5)≥6.700, wherein T3 is a central thickness of the third lens element along the optical axis, and TTL is a distance from the object-side surface of the first lens element to the image plane of the optical imaging lens along the optical axis.

2. The optical imaging lens as claimed in claim 1, wherein the optical imaging lens further satisfies: (T2+T4)/Tmin≥8.100, wherein T2 is a central thickness of the second lens element along the optical axis, and Tmin represents a minimum value among the central thicknesses of the first lens element, the second lens element, the third lens element, the fourth lens element and the fifth lens element along the optical axis.

3. The optical imaging lens as claimed in claim 1, wherein the optical imaging lens further satisfies: ALT/(T3+T5)≥4.600, wherein ALT is a sum of the central thicknesses of the first lens element, the second lens element, the third lens element, the fourth lens element and the fifth lens element along the optical axis.

4. The optical imaging lens as claimed in claim 1, wherein the optical imaging lens further satisfies: 7.000≥TL/G12, wherein TL is a distance from the object-side surface of the first lens element to the image-side surface of the fifth lens element along the optical axis.

5. The optical imaging lens as claimed in claim 1, wherein the optical imaging lens further satisfies: TTL/(T3+T5)≥8.800.

6. The optical imaging lens as claimed in claim 1, wherein the optical imaging lens further satisfies: TL/(G23+T3+G45+T5)≥5.000, wherein TL is a distance from the object-side surface of the first lens element to the image-side surface of the fifth lens element along the optical axis.

7. The optical imaging lens as claimed in claim 1, wherein the optical imaging lens further satisfies: TL/(T3+G45+T5)≥6.000, wherein and TL is a distance from the object-side surface of the first lens element to the image-side surface of the fifth lens element along the optical axis.

8. The optical imaging lens as claimed in claim 1, wherein the optical imaging lens further satisfies: ALT/(G23+T3+G45+T5)≥600, wherein ALT is a sum of the central thicknesses of the first lens element, the second lens element, the third lens element, the fourth lens element and the fifth lens element along the optical axis.

9. The optical imaging lens as claimed in claim 1, wherein a material of the fourth lens element satisfies a condition expression of |dn/dt|≤8.500×10-6/° C.

10. An optical imaging lens comprising a first lens element, a second lens element, a third lens element, a fourth lens element, and a fifth lens element arranged in a sequence from an object side to an image side along an optical axis, wherein each of the first lens element to the fifth lens element comprises an object-side surface facing the object side and allowing imaging rays to pass through and an image-side surface facing the image side and allowing the imaging rays to pass through;

the first lens element comprising negative refractive power, the object-side surface of the first lens element comprising a convex portion in a vicinity of a periphery and the first lens element being made of plastic;

the object-side surface of the second lens element comprising a convex portion in a vicinity of the periphery, and the image-side surface of the second lens element comprising a convex portion in a vicinity of the optical axis;

the image-side surface of the third lens element comprising a concave portion in the vicinity of the optical axis;

the image-side surface of the fourth lens element comprising a convex portion in the vicinity of the periphery; and the object-side surface of the fifth lens element comprising a concave portion in a vicinity of the periphery;

wherein the optical imaging lens comprises at least one piece of the lens elements with a material satisfying a condition expression of $|dn/dt| \leq 8.500 \times 10^{-6}/°$ C., and among the lens elements of the optical imaging lens, only the aforementioned five lens elements have refractive power, and the optical imaging lens satisfies:

$$(T1+G12+T4)/(G23+G45+T5) \geq 0.700$$

wherein T1 is a central thickness of the first lens element along the optical axis, T4 is a central thickness of the fourth lens element along the optical axis, T5 is a central thickness of the fifth lens element along the optical axis, G12 is an air gap between the first lens element and the second lens element along the optical axis, G23 is an air gap between the second lens element and the third lens element along the optical axis, G45 is an air gap between the fourth lens element and the fifth lens element along the optical axis, and |dn/dt| is an absolute value of a temperature coefficient of refractive index, wherein the optical imaging lens further satisfies: ALT/(T3+G45+T5)≥4.400, wherein T3 is a central thickness of the third lens element along the optical axis, and ALT is a sum of the central thicknesses of the first lens element, the second lens element, the third lens element, the fourth lens element and the fifth lens element along the optical axis.

11. The optical imaging lens as claimed in claim 10, wherein the optical imaging lens further satisfies: TL/(T3+T5)≥6.300, wherein TL is a distance from the object-side surface of the first lens element to the image-side surface of the fifth lens element along the optical axis.

12. The optical imaging lens as claimed in claim 10, wherein the optical imaging lens further satisfies: 9.500≥TTL/G12, wherein TTL is a distance from the object-side surface of the first lens element to the image plane of the optical imaging lens along the optical axis.

13. The optical imaging lens as claimed in claim 10, wherein the optical imaging lens further satisfies: TTL/(G23+T3+T5)≥6.800, wherein TTL is a distance from the object-side surface of the first lens element to the image plane of the optical imaging lens along the optical axis.

14. The optical imaging lens as claimed in claim 10, wherein the optical imaging lens further satisfies: TL/(G23+G45+T5)≥6.900, wherein TL is a distance from the object-side surface of the first lens element to the image-side surface of the fifth lens element along the optical axis.

15. The optical imaging lens as claimed in claim 10, wherein the optical imaging lens further satisfies: TL/EFL≥1.700, wherein TL is a distance from the object-side surface of the first lens element to the image-side surface of the fifth lens element along the optical axis, and EFL is an effective focal length of the optical imaging lens.

16. The optical imaging lens as claimed in claim 10, wherein the optical imaging lens further satisfies: 5.600≥ALT/(G12+G45).

17. The optical imaging lens as claimed in claim 10, wherein the optical imaging lens further satisfies: ALT/(G23+G45+T5)≥5.200.

18. The optical imaging lens as claimed in claim 10, wherein a material of the fourth lens element satisfies a condition expression of |dn/dt|≤8.500×10-6/° C.

* * * * *